(12) United States Patent
Liu et al.

(10) Patent No.: US 11,689,131 B2
(45) Date of Patent: Jun. 27, 2023

(54) SYSTEM AND METHOD OF A ROBUST STARTUP AND STOP SCHEME FOR POSITION SENSORLESS CONTROL OF AN ELECTRIC MACHINE

(71) Applicant: Deere & Company, Moline, IL (US)

(72) Inventors: Yiqi Liu, Fargo, ND (US); Long Wu, Fargo, ND (US); Zack M. Day, Gardner, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/643,873

(22) Filed: Dec. 13, 2021

(65) Prior Publication Data

US 2023/0078403 A1   Mar. 16, 2023

Related U.S. Application Data

(60) Provisional application No. 63/261,226, filed on Sep. 15, 2021.

(51) Int. Cl.
  *H02P 21/22*   (2016.01)
  *H02P 27/12*   (2006.01)
  (Continued)

(52) U.S. Cl.
  CPC .............. *H02P 21/22* (2016.02); *H02P 21/09* (2016.02); *H02P 21/13* (2013.01); *H02P 21/18* (2016.02);
  (Continued)

(58) Field of Classification Search
  CPC .......... H02P 21/22; H02P 21/09; H02P 21/13; H02P 21/18; H02P 21/34; H02P 21/36;
  (Continued)

(56) References Cited

U.S. PATENT DOCUMENTS

| 8,796,983 B2 | 8/2014 | Wu et al. |
| 2010/0148710 A1* | 6/2010 | Lim .......................... H02P 6/20 |
| | | 318/400.11 |

(Continued)

FOREIGN PATENT DOCUMENTS

| EP | 1128545 A2 * | 8/2001 | .............. H02P 21/09 |
| EP | 3054584 A1 * | 8/2016 | .............. H02M 7/00 |

OTHER PUBLICATIONS

Marius Fatu et al., I-F Starting Method with Smooth Transition to EMF Based Motion-Sensorless Vector Control of PM Synchronous Motor/Generator, IEEE Power Electronics Specialists Conference, 2008.

(Continued)

*Primary Examiner* — Bickey Dhakal

(57) ABSTRACT

A system and method for controlling an electric machine via an inverter comprises an speed estimator that is configured to estimate a rotor speed of an electric motor to determine whether to control the inverter to operate the electric motor in a first mode or a second mode. For example, the first mode comprises a current-frequency control mode and the second mode comprises a back electromagnetic force (BEMF) mode. An electronic data processor or controller is configured to determine a first (current) command associated with a first mode of operating the electric motor, if the estimated rotor speed is a less than a speed threshold. The electronic data processor or controller is configured to determine a second (current) command associated with a second mode of operating the electric motor if the estimated rotor speed is equal to or greater than the speed threshold.

20 Claims, 14 Drawing Sheets

(51) Int. Cl.
*H02P 21/18* (2016.01)
*H02P 21/09* (2016.01)
*H02P 21/13* (2006.01)
*H02P 21/34* (2016.01)
*H02P 21/36* (2016.01)

(52) U.S. Cl.
CPC .............. *H02P 21/34* (2016.02); *H02P 21/36* (2016.02); *H02P 27/12* (2013.01)

(58) Field of Classification Search
CPC ... H02P 27/12; H02P 21/0021; H02P 23/0027
See application file for complete search history.

(56) References Cited

U.S. PATENT DOCUMENTS

| | | | | |
|---|---|---|---|---|
| 2012/0217913 | A1* | 8/2012 | Wu | H02P 6/20 318/400.04 |
| 2016/0056740 | A1* | 2/2016 | Nondahl | H02P 6/182 318/400.11 |
| 2016/0218657 | A1* | 7/2016 | Nondahl | H02P 6/21 |

OTHER PUBLICATIONS

Zihui Wang et al., Simple Startup Strategy Based on Current Regulation for Back-EMF-Based Sensorless Control of PMSM, IEEE Trans. Power Electronics, 2012.

Wenjie Wang et al., A Novel Smooth Transition Strategy for BEMF-Based Sensorless Drive Startup of PMSM, Proc. 11th World Congress on Intelligent Control and Automation, 2014.

Minghui Wang et al., An Optimized I-F Startup Method for BEMF-based Sensorless Control of SPMSM, IEEE ITEC Asia-Pacific, 2017.

Jufeng Yang et al., A Closed-loop I/f Sensorless Control Based on Current Vector Orientation for Permanent Magnet Synchronous Motors, Proc. 18th International Conference on Electrical Machines and Systems, 2015.

Sandeep Nair et al., A Smooth and Stable Open-Loop I-F Control for a Surface Mount PMSM Drive by Ensuring Controlled Starting Torque, Proc. 44th Annual Conference of IEEE Industrial Electronics Society, 2018.

Gilsu Choi et al., Investigation of Key Factors Influencing the Response of Permanent Magnet Synchronous Machine to Three-Phase Symmetrical Short-Circuit Faults, IEEE Trans. Energy Conversion, 2016.

* cited by examiner

SYSTEM AND METHOD OF A ROBUST STARTUP AND STOP SCHEME FOR POSITION SENSORLESS CONTROL OF AN ELECTRIC MACHINE

RELATED APPLICATION

This document (including the drawings) claims priority and the benefit of the filing date based on U.S. provisional application No. 63/261,226, filed Sep. 15, 2021, and entitled SYSTEM AND METHOD OF A ROBUST STARTUP AND STOP SCHEME FOR POSITION SENSORLESS CONTROL OF AN ELECTRIC MACHINE under 35 U.S.C. § 119 (e), where the provisional application is hereby incorporated by reference herein.

FIELD

This disclosure relates to a system and method of robust start-up and stop scheme for sensorless control of an electric machine.

BACKGROUND

In certain prior art, back electromotive force (BEMF) can be used to estimate position of the rotor of an electric machine without using a position sensor (e.g., sensorless) to control the electric machine. However, a BEMF control scheme is optimal for a medium-to-high speed range because of a corresponding minimum signal-to-noise ratio at such speed range facilitates reliable position sensing; hence, reliable control. Typically, another non-BEMF control scheme, such as open-loop Volts per frequency (V/f) or Volts per Hertz (V/Hz), is required to robustly start up and stop the electric machine at lower speeds, such as zero speed. For example, basic, open-loop V/f control can be used, but this method is susceptible to loss of synchronization and to overcurrent fault due to its unregulated, or open-loop, current excitation. Further, current control model, such as current-frequency control (IF), can improve upon the basic, open-loop V/f control or V/Hz control by applying inherent current regulation control that considers (e.g., estimated rotational speed) the rotational current vector command (or stator current).

In some prior art, even after taking into account the above considerations, the transition between the IF mode and the BEMF mode during the startup and stop process of the electric machine (e.g., surface-mounted permanent magnet machine) may be susceptible to a lack of control responsiveness (e.g., slow dynamics) and/or overcurrent fault during any corresponding mode transition instant or transition period. Therefore, there is a need for a position sensorless startup and stop scheme to achieve a smooth transition between the IF mode and the BEMF mode, as well as a robust and fast startup and stop process.

SUMMARY

In accordance with one embodiment, a system and method for controlling an electric machine (e.g., electric motor) via an inverter comprises an speed estimator that is configured to estimate a rotor speed of an electric motor to determine whether to control the inverter to operate the electric motor in a first mode or a second mode. For example, the first mode comprises a current-frequency control mode and the second mode comprises a back electromagnetic force (BEMF) mode. An electronic data processor or controller is configured to determine a first (current) command associated with a first mode of operating the electric motor, if the estimated rotor speed is a less than a speed threshold. The electronic data processor or controller is configured to determine a second (current) command associated with a second mode of operating the electric motor if the estimated rotor speed is equal to or greater than the speed threshold. The electronic data processor or controller is capable of limiting an instantaneous change in the commanded voltage applied to the electric motor during a transition between the first mode and the second mode.

DETAILED DESCRIPTION

Figures 1, 1A, 1B:
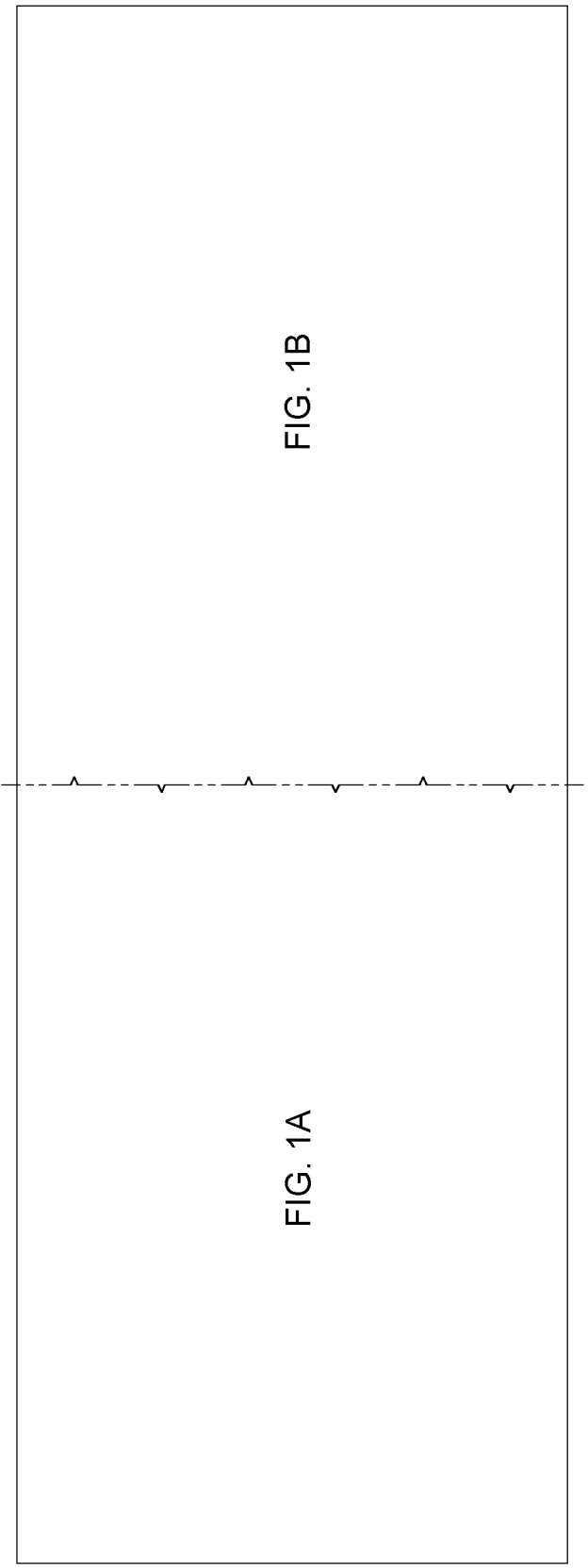
FIG. 1A and FIG. 1B are collectively referred to as FIG. 1 that is a block diagram of one embodiment of an electronic data processing system of an inverter, and its modules, for controlling an electric machine with robust start (e.g., start-up) and stop modes.
Figure 1A:
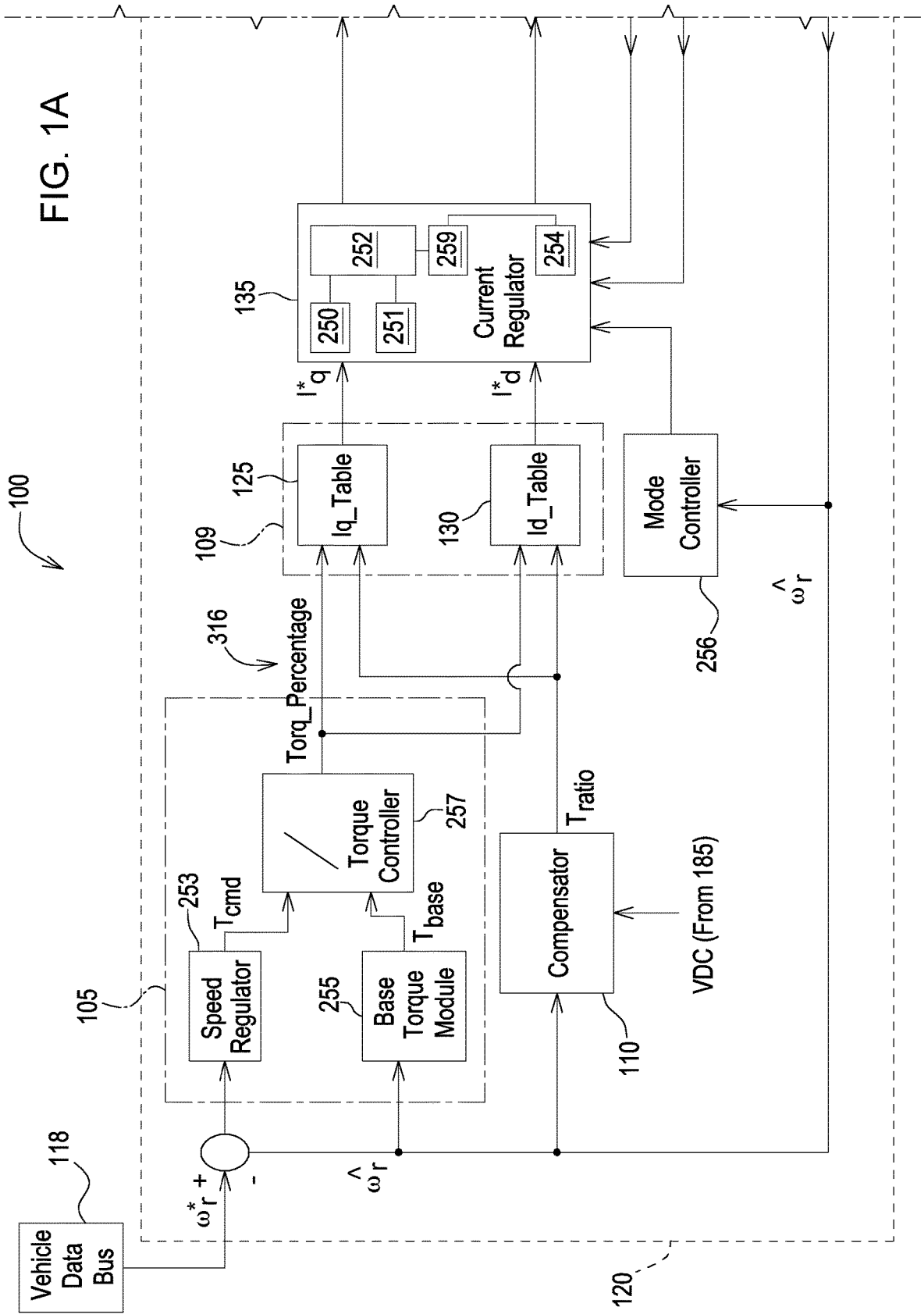
Figure 1B:
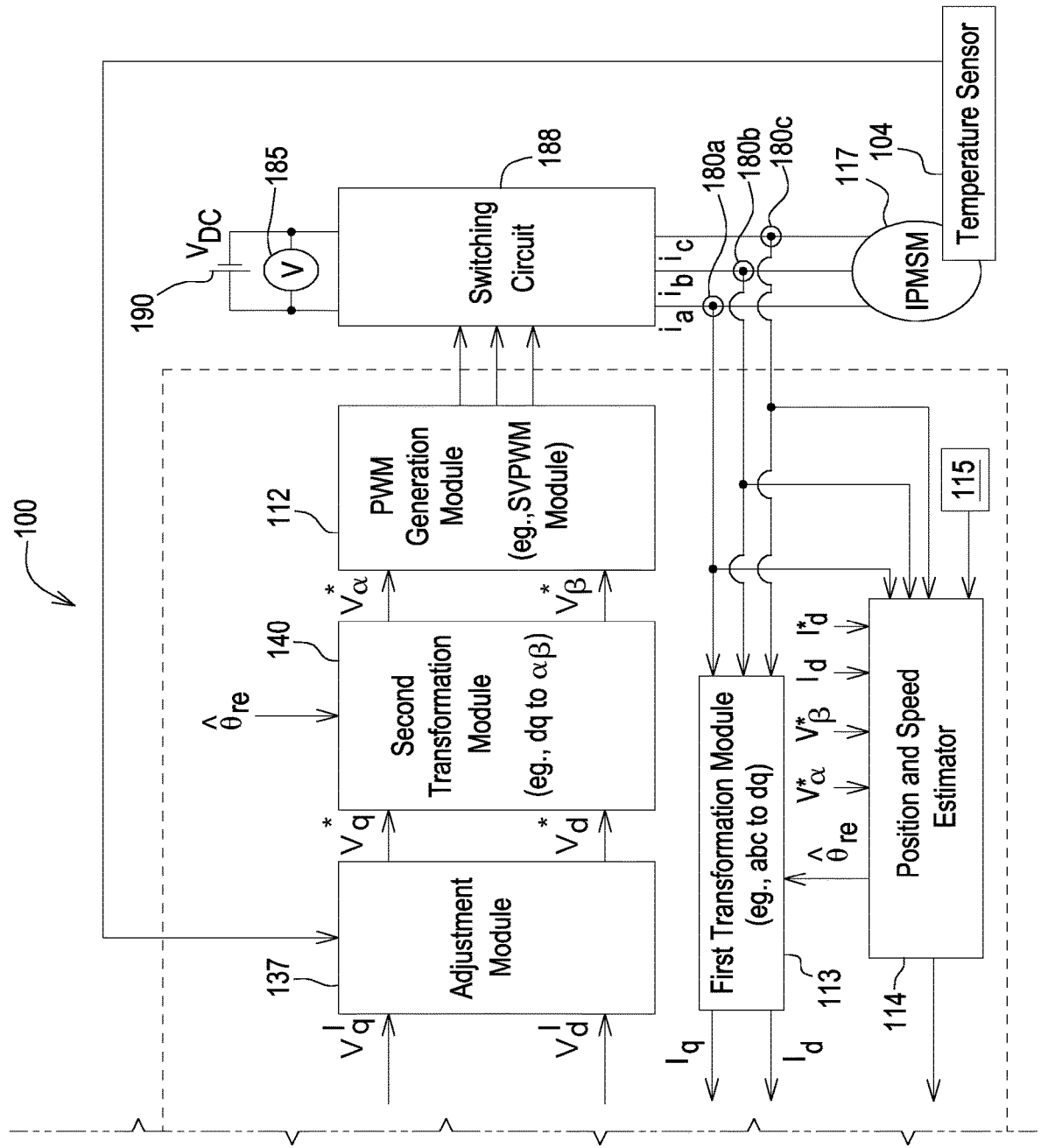

In accordance with one embodiment, a system 100 and method for controlling an electric machine 117 (e.g., electric motor) via an inverter switching circuit 188 comprises an speed estimator (e.g., position and speed estimator 114) that is configured to estimate a rotor speed of an electric machine 117 to determine whether to control the inverter to operate the electric machine 117 in a first mode or a second mode. For example, the first mode comprises a current-frequency control mode (or Volt/Hertz control mode) and wherein the second mode comprises a back electromagnetic force mode (e.g., in conjunction with field oriented control or space vector pulse with modulation control scheme).

An electronic data processor 264, controller 266, or data processing system 120 is configured to determine a first (current) command associated with a first mode of operating the electric machine 117, if the estimated rotor speed is a less than a speed threshold. The electronic data processor 264, controller 266, or data processing system 120 is configured to determine a second (current) command associated with a second mode of operating the electric machine 117 if the estimated rotor speed is equal to or greater than the speed threshold. The electronic data processor 264, controller 266 or data processing system 120 is capable of limiting an instantaneous change in the commanded voltage applied to the electric machine 117 during a transition (e.g., an escalating transition during start-up or acceleration of the rotor or a de-escalating transition during stopping of the rotor of the electric machine 117) between the first mode and the second mode.

In accordance with one embodiment, FIG. 1A and FIG. 1B, collectively, discloses system 100 for controlling an electric machine 117 (e.g., motor) (e.g., an interior permanent magnet (IPM) motor or interior permanent magnet synchronous motor (IPSM)) or another alternating current machine. In one embodiment, the system 100, aside from the electric machine 117 (e.g., motor), may be referred to as an inverter or a motor controller.

The system 100 comprises electronic modules, software modules, or both. In one embodiment, the system 100 comprises an electronic data processing system 120 to support storing, processing or execution of software instructions of one or more software modules. The electronic data processing system 120 is indicated by the dashed lines in FIG. 1A and FIG. 1B, collectively, and is shown in greater detail in FIG. 2.

The data processing system 120 is coupled to an inverter switching circuit 188. The inverter switching circuit 188 comprises a semiconductor drive circuit that drives or controls switching semiconductors (e.g., insulated gate bipolar transistors (IGBT), field-effect transistors or other power transistors) to output control signals for the electric machine 117 (e.g., motor).

In turn, the inverter switching circuit 188 is coupled to the electric machine 117 (e.g., motor). The electric machine 117 (e.g., motor) is associated with an optional sensor 115 (e.g., a position sensor, a resolver or encoder position sensor) that is associated with the motor shaft or the rotor. The sensor 115 and the electric machine 117 (e.g., motor) are coupled to the data processing system 120 to provide feedback data (e.g., current feedback data, such as ia, ib, ic at alternating current phase terminals 180a, 180b and 180c, respectively), raw position signals, among other possible feedback data or signals, for example. Other possible feedback data includes, but is not limited to, winding temperature readings (e.g., of temperature sensor 104), semiconductor temperature readings of the inverter switching circuit 188, three phase voltage data (e.g., at terminals 180a, 180b and 180c), or other thermal or performance information for the electric machine 117 (e.g., motor).

In one embodiment, the torque command generation module 105 is coupled to a d-q axis current generation manager 109 (e.g., d-q axis current generation look-up tables). D-q axis current or d-q axes current refers to the direct axis current and the quadrature axis current as applicable in the context of vector-controlled alternating current machines, such as the electric machine 117 (e.g., motor). The output of the d-q axis current generation manager 109 is inputted to a current regulator 135. In turn, one or more outputs (e.g., commanded direct axis current data (id*) and commanded quadrature axis current data (iq*) or commanded direct axis voltage data and commanded quadrature axis voltage data) of the current regulator 135 are provided or coupled to an adjustment module 137, which may adjust, modify or process the output of the current regulator 135 based on data from one or more sensors, such as a temperature sensor 104 associated with a component (e.g., winding or magnet) or housing of the electric machine 117 (e.g., motor).

As illustrated in FIG. 1A and FIG. 1B, collectively, the current regulator 135 is capable of communicating, directly or indirectly, with the pulse-width modulation (PWM) generation module 112 (e.g., space vector PWM generation module 112). In one embodiment, the current regulator 135 receives respective d-q axis current commands (e.g., Id* and Iq*), the actual (observed) d-q axis currents (e.g., Id and Iq), the observed rotor speed or speed mode selection (e.g., first mode or second mode) from the mode controller 256; the current regulator 135 outputs corresponding d-q axis voltage commands (e.g., commanded Vd* and commanded Vq* or intermediate/unadjusted or uncompensated $V_d^I$ and $V_q^I$) for input, or as precursor input, to the PWM generation module 112.

In one embodiment, the current regulator 135 is coupled to the PWM generation module 112, via the adjustment module 137 and a second transformation module 140 (e.g., also referred to as the second transform module), such as a dq-axis to α-β axis transformation module. The d-q reference frame rotates at a synchronous speed, whereas the α-β axis frame is stationary with the α axis that is orthogonal to the β axis. The α-β axis is generally related to the d-q reference frame by a rotation angle. For example, the second transformation module 140 may apply a Park transformation or equations associated with a Park transformation to convert or transform the d-q reference frame or commanded direct axis voltage and commanded quadrature axis voltage into commanded α axis voltage and commanded β axis voltage.

The PWM generation module 112 converts the direct axis voltage and quadrature axis voltage data from two phase, d-q axis data representations in the d-q reference frame into two-phase, α-β axis representations in the α-β axis reference frame (e.g., stationary reference frame). Outputs of the PWM generation module 112 are coupled to the inverter switching circuit 188.

The inverter switching circuit 188 comprises power electronics, such as switching semiconductors to generate, modify and control pulse-width modulated signals or other alternating current signals (e.g., pulse, square wave, sinusoidal, or other waveforms) applied to the electric machine 117 (e.g., motor). The PWM generation module 112 may comprise a driver stage that applies pulses or signals to the inverter switching circuit 188. An output stage of the inverter switching circuit 188 provides one or more outputs of pulse-width modulated signals or other alternating current signals for control of the electric machine (e.g., motor), which may resemble a sinusoidal alternating current signals. In one embodiment, the inverter switching circuit 188 is powered by a direct current (DC) bus 190, which can be accompanied by measurement interface 185 (e.g., voltage sensor) to provide feedback data to the data processing system 120 or electronic data processor.

The electric machine 117 (e.g., motor) is associated with a rotational sensor 115 (e.g., a resolver, encoder, speed sensor, or another position sensor or rotational motion sensors) that estimates any of the following: an angular position of the rotor (e.g., motor shaft), a speed or velocity of the rotor, and a direction of rotation of the rotor, and acceleration of the rotor. The rotational sensor 115 may be mounted on or integral with the motor shaft or rotor. The output of the optional rotational sensor 115 is capable of communication with the position and speed estimator 114. In one embodiment, the optional rotational sensor 115 may be coupled to an analog-to-digital converter (not shown) that converts analog position data or velocity data to digital position or velocity data, respectively. In other embodiments, the rotational sensor 115 (e.g., digital position encoder) may provide a digital data output of position data or velocity data for the motor shaft or rotor.

Within the position and speed estimator 114, an input of a sensing circuit or transducers 271 are coupled to alternating current (AC) phase terminals (180a, 180b and 180c) of the electric machine 117 (e.g., motor) for sensing at least the measured phase currents (e.g., three-phase currents). Further, the position and speed estimator 114 may receive inputs of commanded alpha-axis voltage ($V^*_\alpha$), commanded beta-axis voltage ($V^*_\beta$) in the alpha-beta stationary reference frame, and/or inputs of commanded direct-axis current (Id*) (and optionally commanded quadrature axis current (Iq*) in the d-q axis reference frame (e.g., rotating d-q axis reference frame), and observed direct axis current (Iq)).

In one embodiment, a position and speed estimator 114 is configured to estimate a first mode rotor speed under a first current control model (e.g., current-frequency model for estimating rotor speed) and a second mode rotor speed under a second current control mode (e.g., Back electromotive force/BEMF model for estimating rotor speed) of an electric machine 117 in accordance with a first speed estimator for the first mode simultaneously with a second speed estimator for the second mode based on observed current at the terminals (180a, 180b, 180c) of the electric machine 117, or based on observed voltages and observed current observed current at the terminals (180a, 180b, 180c) of the electric machine 117. The mode controller 256 may provide data on whether the electric machine 117 is operating in the first mode or the second mode, alone or together with a motoring mode, a power generation mode, a braking mode or a regenerative braking mode.

In the position and speed estimator 114, an output of the sensing circuit or transducers 271 are coupled to an analog-to-digital converter for digitizing the output of the sensing circuit. In turn, the digital output of the analog-to-digital converter is coupled the compensator 110 and the first transformation module 113 (e.g., also referred to as the first transform module 113). For example, the position and speed estimator 114 associated with the electric machine 117 (e.g., motor) for measuring three phase currents (e.g., current applied to the windings of the electric machine 117 (e.g., motor), back-EMF induced into the windings, or both).

A first output (e.g., position data and speed data for the electric machine 117 (e.g., motor)) of position and speed estimator 114 is communicated to the first transformation module 113 (e.g., three-phase to two-phase current Park transformation module) that converts respective three-phase digital representations of measured or observed current (e.g., ia, ib and ic) into corresponding two-phase digital representations of measured or observed current (e.g., Iq and Id). A second output (e.g., speed data, such as observed rotor speed ωr or average observed rotor speed for one or more sampling intervals) of the primary processing module 114 is communicated to the compensator 110 (e.g., adjusted voltage over speed ratio module).

Certain outputs of the position and speed estimator 114 feed the first transformation module 113. For example, the first transformation module 113 may apply a Clarke transformation, followed by a Park transformation or other conversion equations (e.g., certain conversion equations that are suitable are known to those of ordinary skill in the art) to convert the measured three-phase representations of current into two-phase representations of current (e.g., d-q rotating reference frame, d-q stationary reference frame, or α-β stationary reference frame) based on the digital three-phase current data and the angular rotor position data (e.g., electrical angular rotor position data (θre) or average electrical angular rotor position data ($\widetilde{\theta_{re}}$)) over one or more sampling intervals) from the rotational sensor 115. The output of the first transformation module 113 is coupled to the current regulator 135.

Meanwhile, a voltage sensor or measurement interface 185 (e.g., impedance interface or resistive voltage divider) provides a voltage level of the direct current (DC) voltage bus 190 (e.g., high voltage DC bus which may provide DC power to the inverter switching circuit 188) to the compensator 110, such that the compensator 110 can adjust the torque applied, via the current generation manager 109, based on an observed voltage over speed ratio, or similar observed metric.

In one embodiment, the position and speed estimator 114 has an output coupled to an input of the compensator 110 (e.g., adjusted voltage over-speed ratio calculation module). For example, the position and speed estimator 114 may provide speed data (e.g., rotor shaft revolutions per minute (ωr) or average observed rotor speed). The measurement interface 185 may provide a measured level of direct current voltage (e.g., on the direct current (DC) bus of a vehicle) to the compensator 110. The direct current voltage level on the DC bus 190 that supplies the inverter circuit 188 with electrical energy may fluctuate or vary because of various factors, including, but not limited to, ambient temperature, battery condition, battery charge state, battery resistance or reactance, fuel cell state (if applicable), load conditions on the electric machine 117, respective torque and corresponding operational speed of the electric machine 117, and vehicle electrical loads (e.g., electrically driven air-conditioning compressor). The compensator 110 provides input or an adjustment of torque ratio or commanded torque percentage 316 to the dq-axis current generation manager 109. The output of the compensator 110 can adjust or impact current commands generated by the d-q axis current generation manager 109 to compensate for fluctuation or variation in voltage of the direct current bus 190, among other things.

In one embodiment, the torque command generation module 105 comprises a speed regulator 253 and base torque module 255 coupled to a torque controller 257. The speed regulator 253 has an input of commanded speed ($\omega^*_r$) of the rotor of the electric machine 117 from a user input provided via a user interface that is associated with, or in communication with, the vehicle data bus 118. The speed regulator 253 provides a commanded torque (Tcmd or T*) that is compatible with or based on the input of commanded speed ($\omega^*_r$) of the rotor (e.g., from the vehicle data bus 118), the load on the electric machine 117, and the operational mode of the electric machine 117, such as a motoring mode, a braking mode, a power generation mode, or a regenerative braking mode of a vehicle.

The base torque module 255 has an input of observed speed (feedback) of the rotor of the electric machine 117, such as an average observed rotor speed ($\overline{\omega}_r$ or $\omega_r$ hat) of the electric machine 117 over one or more sampling intervals during operation of the electric machine 117. The base torque module 255 provides a base torque (Tbase) that is compatible with or based on the input of the average observed rotor speed, $\overline{\omega}_r$. For example, the base torque module 255 provides a base torque level that is compatible with or based on the input of the average observed rotor speed (e.g., determined in a first mode, a second mode or both simultaneously by corresponding first mode observer and a corresponding second mode observer in the position and speed estimator) and a model of stator field torque, such as a first model (e.g., of current-frequency control or Volt/Hertz control mode) or a second model (e.g., of a field weakening model) of the stator field torque.

In one configuration, the torque controller 257 may estimate a commanded torque percentage 316 of maximum torque, or a torque ratio based on the commanded torque (T* or Tcmd) and the base torque (Tbase), alone or together with the estimated stator current of one or more stator windings of the electric machine 117 to achieve a proper or target rotor flux linkage that is consistent with a model of the stator field torque, such a first model (e.g., of Volt/Hertz control mode or current-frequency control mode) or a second model (e.g., of a field weakening model) of the stator field torque.

As illustrated in FIG. 1A and FIG. 1B, collectively, the d-q axis current generation manager 109 comprises a set of look-up tables, such as a first look-up table 125 (e.g., Iq look-up table) or a second look-up table 130 (e.g., Id look-up table), that are based on a characterization of the electric machine 117, specifications of the electric machine 117, or preprogrammed binary files or object code files with parameter/configuration settings provided by the manufacturer of the electric machine 117. In one embodiment, the first look-up table (e.g., Iq look-up table) comprises a file (e.g., inverted file), table, database or other data structure that stores a relationship between a commanded torque percentage 316, a torque ratio (Tratio) (e.g., provided by the compensator 110) and a commanded quadrature-axis torque. Similarly, the second look-up table (e.g., Id look-up 130) table comprises a file (e.g., inverted file), table, database, or other data structure that stores a relationship between a commanded torque percentage 316, a torque ratio and a commanded direct-axis torque. The d-q axis current generation manager 109 receives the commanded torque percentage 316 (T*perc or T*percentage) and the torque ratio from the compensator 110 as inputs and the d-q axis current generation manager 109 outputs the commanded direct-axis current ($I^*_d$) and commanded quadrature axis current ($I^*_q$) (e.g., to the current regulator 135).

In one embodiment, the d-q axis current generation manager 109 selects or determines the direct axis current command data and the quadrature axis current command data associated with respective torque control command data and respective detected motor shaft speed data. For example, the d-q axis current generation manager 109 selects or determines the direct axis current command, the quadrature axis current command by accessing one or more of the following: (1) one or more look-up tables, databases or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. In one illustrative configuration as shown in FIG. 1A and FIG. 1B, collectively, the d-q axis current generation manager 109 comprises a first look-up table 125, such as a commanded quadrature-axis current look-up table for a corresponding commanded quadrature axis torque based on commanded torque ratio or commanded torque percentage 316 of maximum torque, and a second look-up table 130, such as a commanded direct-axis current look-up table for a corresponding commanded direct-axis torque based on commanded torque ratio or commanded torque percentage 316 of maximum torque.

Figure 8:
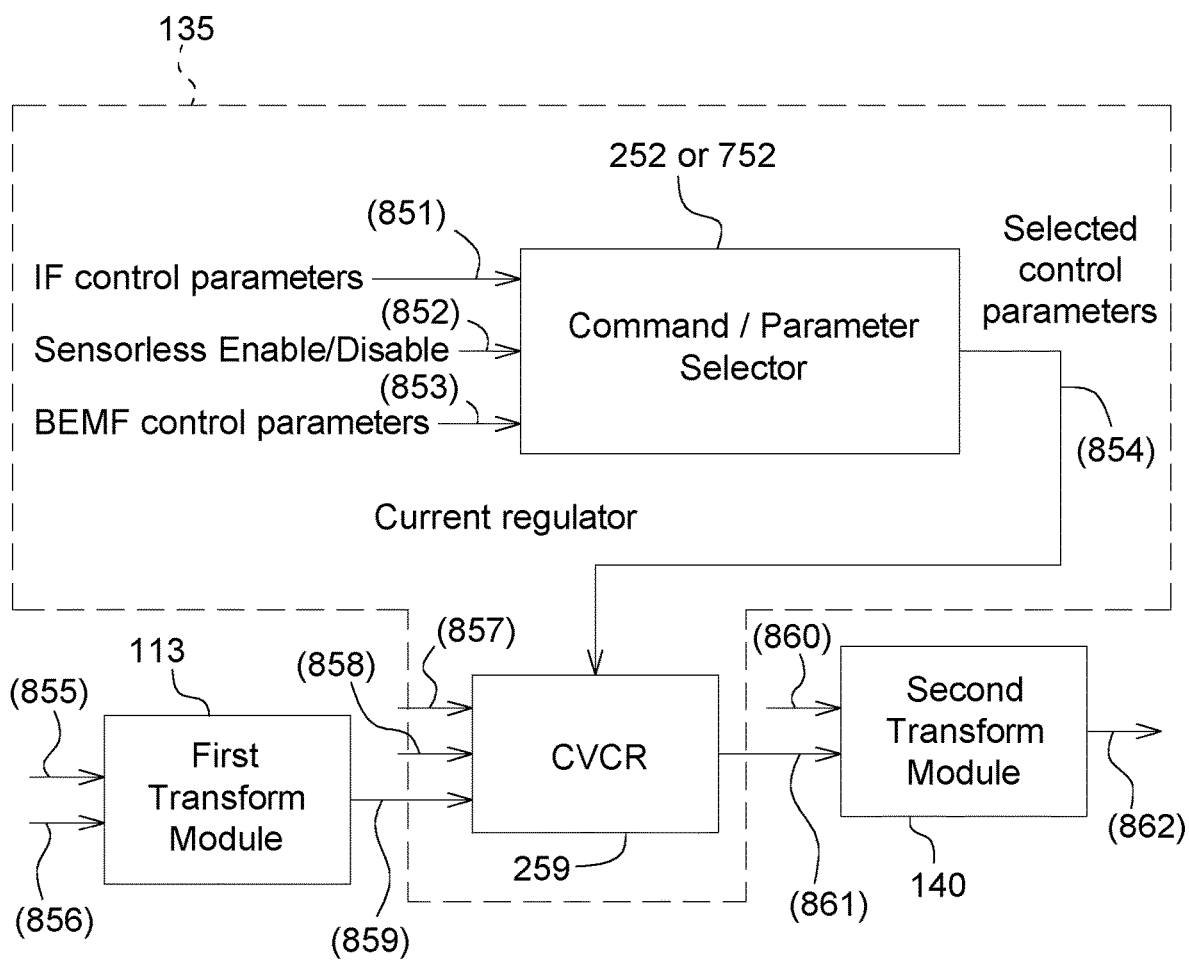
FIG. 8 is a block diagram of one embodiment of the current regulator.

In one embodiment, the current regulator 135 receives inputs from mode controller 256 to determine whether to control the inverter to operate the electric machine 117 in a first mode or a second mode via a mode selector 252 in the current regulator 135, wherein the first mode comprises a current-frequency control mode and wherein the second mode comprises a back electromagnetic force mode. For example, the mode selector 252 may comprise a switch or a multiplexer that selects one or more input data messages or data samples at a corresponding input port for output to an output port. Further, the mode selector 252 may comprise a command/parameter selector 752 as illustrated in FIG. 8 that selects IF control parameters or BEMF control parameters for application, directly or indirectly, to the electric machine 117 as selected control parameters.

As illustrated in FIG. 1A and FIG. 1B, collectively, the output port of the mode selector 252 is coupled to limiter 254, directly or indirectly via a complex vector current regulator (CVCR) 259. Further, a current regulator 135 comprises a first current controller 250, a second current controller 251, a mode selector 252, a CVCR 259 and a limiter 254. The first current controller 250 and second current controller 251 are configured to communicate with the mode selector 252. In turn, the mode selector 252 is configured to communicate with the CVCR 259, the limiter 254, or both.

The first current controller 250 is configured to determine a first (current) command associated with a first mode of operating the electric machine 117, if the estimated rotor speed (of the electric machine 117) is a less than a speed threshold (e.g., a threshold minimum velocity or minimum speed). The first current controller 250 may be configured as a current-frequency current controller 266 or as field-weakening controller 266.

The second current controller 251 is configured to determine a second (current) command associated with a second mode of operating the electric machine 117 if the estimated rotor speed is equal to or greater than the speed threshold (e.g., a threshold minimum velocity or minimum speed). The second current controller 251 is configured as a current-frequency current controller or as a field weakening controller.

In one configuration, the first current controller 250 comprises a current-frequency model for estimating rotor speed of the electric machine 117 in a first mode, or in both the first mode and the second mode. The second current controller 251 comprises a Back electromotive force (BEMF) model for estimating rotor speed of the electric machine 117 (e.g., possibly in conjunction with field oriented control of the electric machine 117 of a space vector pulse width modulation control scheme) in a second mode, or in both the first mode and the second mode. A mode controller 256 is configured to determine whether to control the inverter to operate or control the electric motor in a first mode or a second mode, via a mode selector 252 (e.g., switch or multiplexer) in the current regulator 135.

In one configuration, a limiter 254 comprises a first limiter (e.g., first slew regulator), a second limiter (e.g., second slew regulator), or both; the limiter 254 is configured: (a) to limit an instantaneous change in the commanded voltage or commanded current applied to the electric machine 117 (e.g., or to limit change, bump or discontinuity in the (electrical) angle or (electrical) speed of the rotor) during a transition between the first mode and the second mode. A limiter 254 (e.g., first limiter) is configured to limit an instantaneous change in the commanded voltage applied to the electric machine 117 during a transition between the first mode and the second mode by limiting or adjusting a slew rate of the commanded direct axis current and commanded quadrature axis current in the first mode and the second mode to a speed feedback used in a complex vector current regulator (CVCR) 259. In one embodiment, the limiter 254 further comprises a second limiter (e.g., integral with or associated with the position and speed estimator 114 or the second transformation module 140) that is configured to limit a change in position feedback (e.g., $\widehat{\theta_{re}}$ or $\theta_{re}$ hat) used for a mathematical transform from a commanded d-q axes-voltage reference frame to a commanded multiphase voltage reference frame (e.g., stationary commanded α-β axes-voltage reference frame).

In one embodiment, the adjustment module 137 comprises a rotor magnet temperature estimation module, a current shaping module, and/or a terminal voltage feedback module. The adjustment module 137 may be coupled to or is capable of communicating with the PWM generation module 112 to adjust the modulation or fundamental frequency of the signals, or pulse trains, outputted by the PWM generation module 112 (e.g., to the inverter switching circuit 188).

In one configuration, the adjustment module 137 estimates or determines the temperature of the rotor permanent magnet or magnets, or the stator windings. In one embodiment, a rotor magnet temperature estimation module within the adjustment module 137 may estimate the temperature of the rotor magnets or stator windings of the electric machine 117 from internal control variables calculation, one or more temperature sensors 104 located on the stator, in thermal communication with the stator, or secured to the housing of the electric machine 117 (e.g., motor). The temperature sensors 104 may comprise a thermistor or infrared thermal detector, where the thermistor or detector provides a signal (e.g., wireless signal) indicative of the temperature of the magnet or magnets.

In one embodiment, the method or system 100 may operate in the following manner. The torque command generation module 105 receives an input control data message, such as a speed control data message (e.g., commanded rotor speed, ω*$_r$), a voltage control data message, or a torque control data message, over a vehicle data bus 118. The torque command generation module 105 converts the received input control message into torque control command data or commanded torque percentage 316.

In one embodiment, the optional rotational sensor 115 on the electric machine 117 (e.g., motor) facilitates provision of the detected speed data for the rotor (e.g., or its shaft) of the electric machine 117, where the position and speed estimator 114 may convert position data provided by the optional rotational sensor 115 into speed data, velocity data, and/or acceleration data.

In an alternate embodiment, the position and speed estimator 114, which can also be referred to as position/motion estimator or estimator, can provide one or more of the following: rotor position data, rotor velocity data, and/or rotor acceleration data to the compensator 110 or to other modules, such as the mode controller 256, and the d-q axis current generation manager 109. The position and speed estimator 114 may comprise a first speed observer for the first mode (e.g., current-frequency mode of rotor position, speed, and/or motion estimation) and a second speed observer for the second mode (e.g., BEMF mode of rotor position, speed and/or motion estimation).

The adjustment module 137 (e.g., d-q axis voltage adjustment module or d-q axis current adjustment module) provides voltage or current adjustment data to adjust any of the following: the commanded direct-axis current data, commanded quadrature-axis current data (e.g., based on input data from the rotor magnet temperature sensor 104), the commanded direct-axis voltage data, commanded quadrature-axis voltage data (e.g., based on input data from the rotor magnet temperature sensor 104).

Within the command generation module 105, the base torque module 255 may determine a correction or preliminary adjustment of the quadrature-axis (q-axis) current command and the direct-axis (d-axis) current command based on one or more of the following factors: torque load on the electric machine 117 (e.g., motor) and rotor speed of the electric machine 117 (e.g., motor), for example. The compensator 110 may provide a torque ratio adjustment or a voltage-over-speed adjustment to d-axis and q-axis current based on a control voltage command versus voltage limit. As illustrated in one example, the compensator 110 may estimate a percentage of maximum torque or torque ratio based on the observed rotor speed, the observed DC voltage of the DC bus 190, and a derating factor, such as by the following or similar derating factor of:

$$\frac{V_{DC}}{\widehat{\omega_r}/\sqrt{3}},$$

where √3 may be replaced by a value based on a ratio of the observed rotor speed to the maximum rotor speed for the voltage/Hertz control mode or for the current-frequency control mode, where is the observed DC bus voltage on the DC bus 190 and $\widehat{\omega_r}$ is the average (e.g., geometric mean, mode or median) observed rotor speed over one or more sampling intervals (e.g., successive sampling intervals).

In one embodiment, the optional rotational sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). The optional rotational sensor 115 can be shown in dashed lines to indicate that it is optional and may be deleted in alternate embodiments. Further, the system may operate in a sensorless mode even if the optional rotational sensor 115, is present, idle, disabled or in an inactive state.

In one configuration, the optional rotational sensor 115 comprises a position sensor, where position data and associated time data are processed to determine speed or velocity data for the motor shaft. In another configuration, the optional rotational sensor 115 comprises a speed sensor, or the combination of a speed sensor and an integrator to determine the position of the motor shaft.

In yet another configuration, the optional rotational sensor 115 comprises an auxiliary, compact direct current generator that is coupled mechanically to the shaft of the electric machine 117 (e.g., motor) to determine speed of the shaft, where the direct current generator produces an output voltage proportional to the rotational speed of the shaft. In still another configuration, the optional rotational sensor 115 comprises an optical encoder with an optical source that transmits a signal toward a rotating object coupled to the rotor shaft of the electric machine 117 (e.g., motor) and receives a reflected or diffracted signal at an optical detector, where the frequency of received signal pulses (e.g., square waves) may be proportional to a speed of the motor shaft. In an additional configuration, the optional rotational sensor 115 comprises a resolver with a first winding and a second winding, where the first winding is fed with an alternating current, where the voltage induced in the second winding varies with the frequency of rotation of the rotor.

As illustrated in FIG. 1, the data processing system 120 can execute certain calculations, estimations or determinations in a synchronous d-q axis reference frame, in a stationary reference frame (e.g., stationary d-q axis reference frame or stationary α-β axis reference frame), or in a three-phase reference frame, or any combination of the foregoing reference frames.

In accordance with one embodiment, a position and speed estimator 114 supports control of a permanent magnet machine by estimating one or more of the following: rotor position data, rotor speed or rotor velocity data, and rotor acceleration data (collectively position and motion data) based upon the current measurements of one or more phase outputs. As illustrated in FIG. 1A and FIG. 1B, collectively, in conjunction with FIG. 2, the position and speed estimator 114 or a state evaluator may be stored in a data storage device 260 or implemented by software instructions provide to one or more electronic data processors 264.

In one embodiment, a state evaluator or observer is incorporated within the position and speed estimator 114, or within a motion estimator, or within position estimator that replaces the position and speed estimator 114. The state evaluator or observer is adapted to determine whether the electric machine 117 is operating within a first speed range or a second speed range, where the second speed range is greater than the first speed range. Further, in certain embodiments, the state evaluator or observer determines whether the machine is operating within a transition speed range between or overlapping partially with the first speed range, the second speed range or both.

In the first speed range, the position and speed estimator 114, motion estimator, speed estimator, or mode controller 256 may estimate rotor position and/or motion data based on Volts per frequency (e.g., Volts per Hertz), or other open-loop control techniques in accordance with a second mode, or based on current-frequency (IF) control mode. Alternately, in the first speed range, the position and speed estimator 114, motion estimator, speed estimator or mode controller 256 could control current or voltage injection into the windings to facilitate back electromotive force estimations at lower rotor speeds. In the second speed range, the position and speed estimator 114 motion estimator, speed estimator, or mode controller 256 may estimate rotor position and/or motion data based on the back electromotive force (EMF) in accordance with a first mode that is compatible with precise field-oriented control (FOC), such as space-vector-pulse-width-modulation (SVPWM) of the motor torque, position and motion.

In one configuration, a sensor (e.g., a sensing circuit in the position and speed estimator 114) is configured to sense current, voltage or both of one or more output phases of an inverter. In one embodiment, the sensor (e.g., sensing circuit) or measurement interface 185 comprises a current sensor or voltage sensor combined with a voltage-to-current converter (e.g., unity gain voltage-to-current amplifier). The sensed current is associated with or indicative of back electromotive force of the machine; further, an analog-to-digital converter can convert one or more measured or observed current phase outputs into digital signals for processing by one or more electronic data processors 264.

In the digital domain, a converter or electronic data processor 264 can convert the digital sensed current into current vectors associated with a stationary reference frame. The converter may receive three phase current inputs or inputs in the d-q axis reference frame for the conversion into the stationary reference frame.

In the position and speed estimator 114 or by the electronic data processor 264, the digital converted, sensed current vectors are used in a current model to estimate back EMF vectors. As indicated above, a state evaluator, or one or more observers are adapted to determine whether the machine is operating within a first speed range or a second speed range, where the second speed range is greater than the first speed range.

In the second speed range of the rotor, back-EMF amplitude in a permanent magnet synchronous machine (PMSM) or motor is proportional to the rotor speed; hence, there is a constraint on the low speed limit in which back-EMF tracking can estimate an accurate rotor position. A back-EMF tracking module can estimate the rotor position in a second speed range (e.g., from medium to high speed operation).

Volts per frequency control mode, such as V/Hz (Volts/Hertz) control mode or current-frequency control mode, can be used to control the rotor velocity machine within a first speed range, such as at startup of the motor from zero speed to a first speed threshold. In practice, the first speed threshold may be set to an upper limit of first speed range or lower speed range.

Field-oriented control mode (e.g., space-vector-pulse-width-modulation (SVPWM) control mode or field-weakening region control) can be used to control the rotor velocity machine within a second range that is greater in rotor velocity that the first range. The second range has a second speed threshold that may be set to a lower limit of the second speed range. The second speed range may encompass a medium-speed range or a high-speed range. V/Hz does not require position and speed feedback to operate and is compatible with control of the permanent magnet machines or other non-reluctance machines. However, V/Hz control is limited because it is an open-loop control method.

In an alternate embodiment, V/Hz mode can be used to control the rotor velocity of the machine when the back-electromotive feedback speed (BMEF) is not available to has quality (e.g., observed signal-to-noise ratio) that falls below a quality threshold (e.g., minimum signal to noise ratio).

V/Hz control avoids variation in the magnetic field strength by varying the applied voltage with a corresponding frequency to maintain a V/Hz ratio that is generally constant or within a certain range. For example, or each target rotor velocity, the V/Hz control can be represented as a quadratic function of rotor velocity and torque. In some applications, the torque at startup is associated with maximum loading capability.

Figure 2:
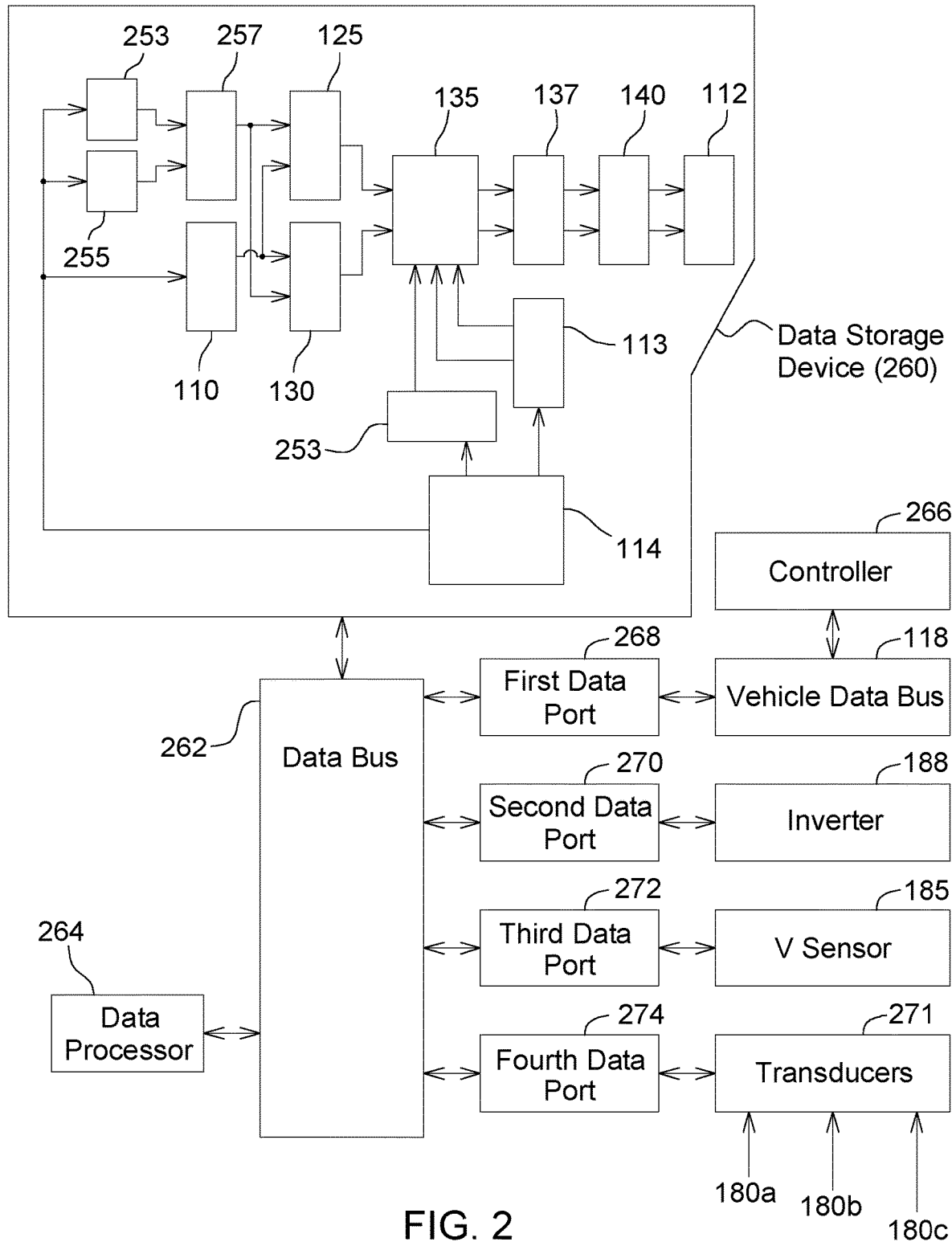
FIG. 2 is a block diagram of one embodiment of an electronic data processing system of an inverter for controlling an electric machine, which is consistent with FIG. 1.

In FIG. 2, the electronic data processing system 120 comprises an electronic data processor 264, a data bus 262, a data storage device 260, and one or more data ports (268, 270, 272, and 274). The data processor 264, the data storage device 260 and one or more data ports are coupled to the data bus 262 to support communications of data between or among the data processor 264, the data storage device 260 and one or more data ports (268, 270, 272, and 274).

In one embodiment, the data processor 264 may comprise one or more of the following electronic components: an electronic data processor, a microprocessor, a microcontroller, a programmable logic array, a field programmable gate array (FPGA), a logic circuit, an arithmetic logic unit, an application specific integrated circuit, a digital signal processor (DSP), a proportional-integral-derivative (PID) controller, or another data processing device. The above electronic components may be interconnected via one or more data buses, parallel data buses, serial data buses, or any combination of parallel and serial data buses, for example.

The data storage device 260 may comprise any magnetic, electronic, or optical device for storing data. For example, the data storage device 260 may comprise an electronic data storage device, an electronic memory, non-volatile electronic random-access memory, one or more electronic data registers, data latches, a magnetic disc drive, a hard disc drive, an optical disc drive, or the like.

As shown in FIG. 2, the data ports comprise a first data port 268, a second data port 270, a third data port 272, and a fourth data port 274, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the data bus 262. In turn, the data bus 262 is coupled to the controller 266, directly or indirectly via the vehicle data bus 118. In one configuration, the second data port 270 may be coupled to the inverter switching circuit 188; the third data port 272 may be coupled to the measurement interface 185 (e.g., voltage sensor); and the fourth data port 274 may be coupled to the transducers 271 or inverter phase alternating current (AC) terminals (180a, 180b, and 180c).

In one embodiment of the data processing system 120, the torque command generation module 105 and/or controller 266 (e.g., CVCR 259 or current regulator 135), is associated with, or supported by, the first data port 268 of the electronic data processing system 120. The first data port 268 may be coupled to a vehicle data bus 118, such as a controller 266 area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller, or other control device.

In certain embodiments, the measurement interface 185 (e.g., voltage sensor) and the position and speed estimator 114 may be associated with or supported by a third data port 272 of the data processing system 120.

In one embodiment, a first transformation module 113 (e.g., abc-current-axis to dq-current-axis converter) or electronic data processor 264 is adapted to convert the sensed current at one or more terminals (e.g., alternating current phase terminals, such as 180a, 180b and 180c) of electric machine 117 into current vectors associated with a stationary reference frame, such as a d-q axis stationary or rotating reference frame.

A position and speed estimator 114 or current regulator 135 is configured to estimate back-EMF vectors from the converted current vectors, such as the observed direct-axis current and the observed quadrature-axis current (e.g., of a d-q axis stationary reference frame). In the second speed range or second mode of the electric machine 117, back-EMF amplitude in the electric machine 117 (e.g., a permanent magnet synchronous machine (PMSM) or motor) is proportional to the rotor speed; hence, there is a constraint on the low-speed limit in which back-EMF tracking can estimate an accurate rotor position. A back-EMF tracking module (e.g., within the position and speed estimator 114 and/or current regulator 135) can estimate the rotor position in a second speed range (e.g., from medium to high speed operation) in the respective second mode of operation of the inverter and electric machine 117.

In contrast, volts per frequency control mode, such as V/Hz (Volts/Hertz) control mode, or current control mode, can be used to control the rotor velocity of the electric machine 117 in a first mode within a respective first speed range, such as at startup of the electric machine 117 from a zero rotor speed to a first speed threshold or first rotor speed threshold. In practice, the first speed threshold may be set to an upper limit of first speed range or lower speed range of the rotor of the electric machine 117.

The second range has a second speed threshold or second rotor speed threshold that may be set to a lower limit of the second speed range. The second speed range may encompass a medium-speed range or a high-speed range of the rotor of the electric machine 117. V/Hz does not require position and speed feedback to operate and is compatible with control of the permanent magnet machines or other non-reluctance machines. However, V/Hz control is limited because it is generally applied as an open-loop control method.

In an alternate embodiment, regardless of the rotor speed for any given sampling interval of the position and speed estimator 114, the V/Hz mode or current-frequency mode can be used to control the rotor velocity of the machine when the back-electromotive feedback speed (BMEF) is not available to has quality (e.g., observed signal-to-noise ratio) that falls below a quality threshold (e.g., minimum signal to noise ratio).

V/Hz control avoids variation in the magnetic field strength by varying the applied voltage with a corresponding frequency to maintain a V/Hz ratio that is generally constant or within a certain range. For example, or each target rotor velocity, the V/Hz control can be represented as a quadratic function of rotor velocity and torque. In some applications, the torque at startup is associated with maximum loading capability.

For the first speed range of the rotor or in accordance with the first mode, the position/motion estimator or position and speed estimator 114 can estimate the position and motion of the rotor of the electric machine 117 in accordance with the applicable V/Hz control equations or current-frequency (IF) equations. For example, for the first speed range of the rotor or in accordance with the first mode, the position/motion estimator or the can estimate the position and motion of the rotor in accordance with the following V/Hz control equations:

$$V_q = \omega^* \lambda_m; \quad V_d = 0,$$

where $V_q$ is the quadrature-axis voltage, $V_d$ is the direct axis voltage, ω is electrical rotor speed in radians/second, $\lambda_m$ is the flux linkage of the permanent magnets of the machine.

The electric machine d-q voltage equations can be written as:

$$V_q = I_q * r_s + \omega L_s I_d + \omega \lambda_m,$$

$$V_d = I_d * r_s - \omega L_s I_q, \text{ and}$$

$$V_d^2 + V_q^2 = (\omega^2 L_s^2 + R^2)i_d^2 + 2\omega^2 \lambda_{pm} L_s i_d + [(\omega^2 L_s^2 + R^2)i_q^2 + 2R\omega\lambda_{pm}i_q] = 0$$

where $V_q$ is the quadrature-axis voltage, $I_q$ is the quadrature-axis current, $V_d$ is the direct axis voltage, $I_d$ is the direct-axis current, R or $r_s$ is the resistance of a phase of the stator windings, ω is electrical rotor speed (e.g., in radians/second), $L_s$ is the inductance of the stator, $\lambda_m$ or $\lambda_{pm}$ is the flux linkage of the permanent magnets in the electric machine 117.

The above equation can be limited to real solutions and re-written as a quadratic function as follows:

$$f(\omega, i_q) = (\omega^2 L_s^2 + R^2)i_q^2 + 2R\omega\lambda_{pm}i_q - \frac{\omega^4 \lambda_{pm}^2 L_s^2}{(\omega^2 L_s^2 + R^2)} \leq 0,$$

where ω is electrical rotor speed (e.g., in radians/second), $L_s$ is the machine inductance, R is the resistance of one phase of the stator windings, $i_q$ is the quadrature-axis current, $\lambda_{pm}$ is the flux linkage of the permanent magnets of the electrical machine.

In terms of torque, or replacing quadrature-axis current ($I_q$) with commanded torque ($T_e$) in the equation above:

$$f(\omega, T_e) = \frac{(\omega^2 L_s^2 + R^2)}{k_t^2} T_e^2 + \frac{2R\omega\lambda_{pm}}{k_t} T_e - \frac{\omega^4 \lambda_{pm}^2 L_s^2}{(\omega^2 L_s^2 + R^2)} \leq 0,$$

where $k_t$ is sampling time interval.

Figure 3:
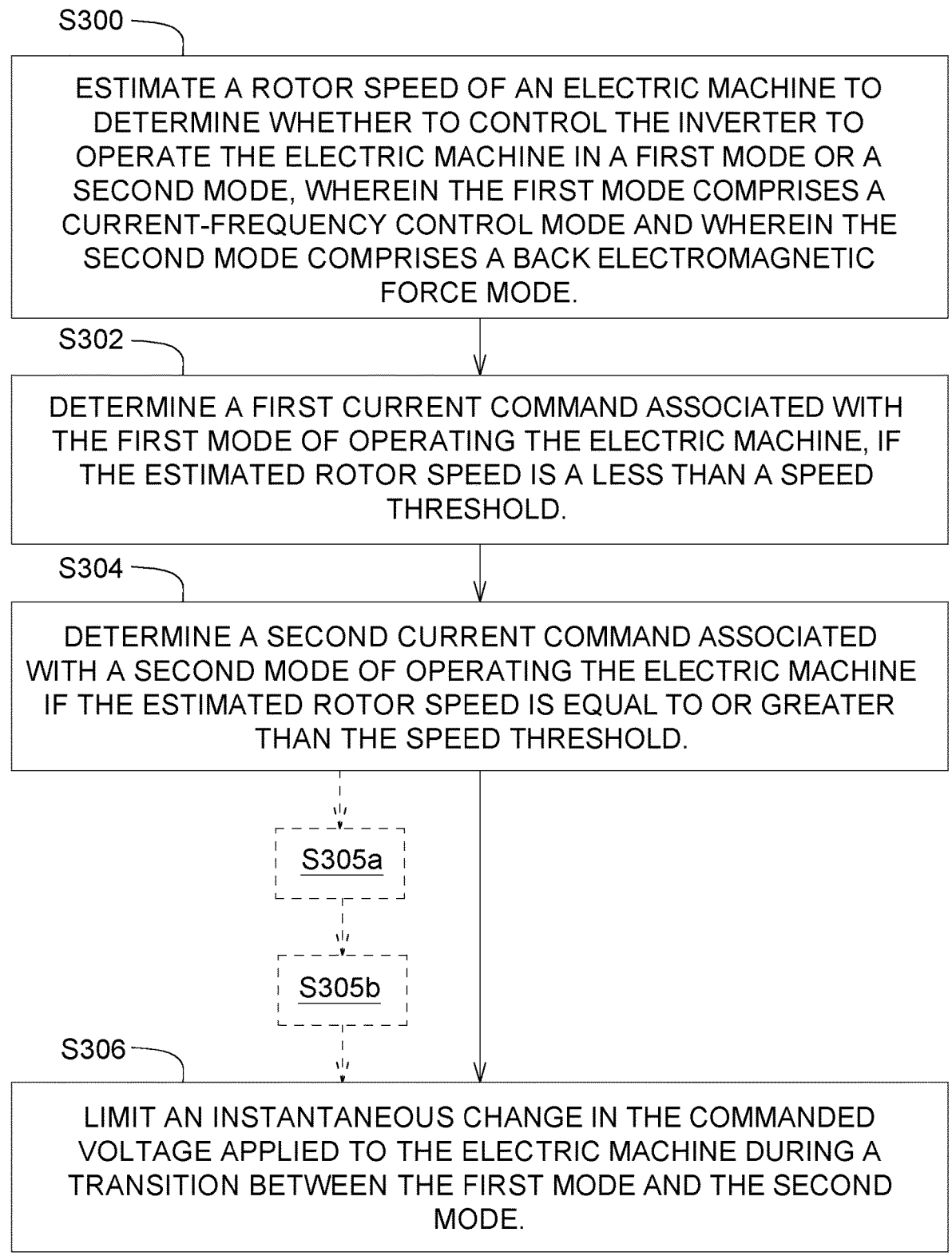
FIG. 3 is a first embodiment of a flow chart of a method for controlling an electric machine with robust start-up and stop modes.

FIG. 3 discloses one embodiment of a flow chart for controlling an electric machine 117. The method of FIG. 3 begins in step S300.

In step S300, a data processor 264 or estimator, such as the position and speed estimator 114, estimates a rotor speed of an electric machine 117 (e.g., electric motor) to determine whether to control the inverter to operate the electric machine 117 a first mode or a second mode. Further, the first mode comprises a current-frequency (IF) control mode (or, alternately, a V/Hz control mode) and the second mode comprises a back electromagnetic force mode (back EMF).

In step S302, an electronic data processor 264, current regulator 135, or first current controller 250 determines a first current command associated with the first mode of operating the electric machine 117 if the estimated rotor speed is less than a speed threshold.

In step S304, an electronic data processor 264, a current regulator 135, or a second current controller 251 determines a second current command associated with the second mode of operating the electric machine 117 if the estimated rotor speed is equal to or greater than the speed threshold.

In one illustrative embodiment, a data processor 264 or current regulator 135 (or its mode selector 252) determines or selects a first current command (e.g., of a respective first current controller 250) associated with the first mode of operating the electric machine 117 and a second current command (e.g., of a respective second current controller 251) associated with the second mode of operating the electric machine 117, while: (a) applying the first current command to the (alternating current) terminals of electric machine 117 if the estimated rotor speed is less than the speed threshold, or (b) applying the second current command to the (alternating current) terminals of the electric machine 117 if the estimator rotor speed is equal to or greater than the speed threshold.

Steps S305a and S305b are optional steps, methods or procedures, where the optional nature of the steps, methods or procedure is indicated by the dashed lines. Optional steps S305a and S305b are described later in this document.

In step S306, the electronic data processor 264 or a limiter 254 limits or manages an instantaneous change in the commanded voltage (or commanded current) applied to the electric machine 117 during a transition between the first mode and the second mode.

Step S306 may be carried out in accordance with various techniques which may be applied separately or cumulatively.

Under a first technique, during a startup or acceleration of the rotor from a rest state to operating a first mode, the transition (e.g., accelerating or escalating/increasing speed transition) from the first mode to the second mode can be made to limit or manage an instantaneous change in the in the commanded voltage (or commanded current) applied to the electric machine 117 during a transition between the first mode and the second mode. For instance, the rotor speed initially progresses from a rest state to a rotor speed within the first mode or corresponding first speed range, where during or after the accelerating transition the rotor speed increases or escalates from the first mode to the second mode (or corresponding second speed range).

Under a second technique, during steady state operation of the rotor in a second mode, the transition (e.g., decelerating or de-escalating/decreasing speed transition) from the second mode to the first mode, such as stopping or deceleration of the rotor of the electric machine 117, can be made to limit or manage an instantaneous change in the in the commanded voltage (or commanded current) applied to the electric machine 117 during a transition between the first mode and the second mode. For instance, the rotor speed initially progresses from a steady state of operation of the rotor speed within the second mode or corresponding second speed range, where during or after a decelerating transition the rotor speed decreases or deescalates from the second mode to the first mode (or corresponding first speed range).

Under a third technique, during a steady state operation of the rotor in the second mode, the electronic data processor 264, the controller 266 or the current regulator 135 is configured to generate a first commanded quadrature-axis current. During a slowing or braking of rotation of the rotor from a rotating state in the second mode, the electronic data processor 264, the controller 266 or the current regulator 135 is configured to generate a second commanded quadrature-axis current that is lower than the first commanded quadrature-axis current. After attaining the speed threshold, during slowing or braking of rotation of the rotor from the rotating state in the first mode, the electronic data processor 264, the controller 266 or the current regulator 135 is configured to generate a third commanded quadrature axis current that approaches zero prior to grounding one or more windings of the electric machine 117.

Under a fourth technique, the electronic data processor 264, the controller 266 or the current regulator 135 is configured to generate a maximum value of the second commanded quadrature axis current and the third quadrature axis current that is negative (e.g., to maximize braking or deceleration of the rotor of the electric machine 117).

Under a fifth technique, the electronic data processor 264, the controller 266 or the current regulator 135 is configured to adjust or reset a controller 266 or regulator such that a last (exit) commanded direct-axis current ($i_d^*$) and a last (exit) commanded quadrature-axis current ($i_q^*$) in the second mode is aligned to match an initial (entry) commanded direct-axis current and initial (entry) commanded quadrature-axis current in the first mode during a stopping where a decreasing rotational speed of the rotor changes to be less than the speed threshold for a transition between the first mode and the second mode.

Further techniques for executing step S306 are explained below, such further techniques can be applied alternately or cumulative with the above five techniques:

Transitions Between First Mode and Second Mode

In the V/Hz control mode (or the IF control mode), for a fixed speed operating point and known load state, $\theta_{diff}$ or $\theta_L$, Vd*, Vq* can be calculated with a certain corresponding K, consistent with Equations 1 and 2, which appear below in this document. If the load state is below a load threshold, then the $\theta_{diff}$ or $\theta_L$ is approximately zero, the transition between the first mode (e.g., V/Hz mode or IF mode) and the second mode (e.g., BEMF mode) with accompanying field-oriented control (FOC), such as space vector pulse-width modulation (SVPWM) control, is simplified for aligning shaft position for the transition between the first mode and the second mode. For example, field-oriented control (FOC) determines a commanded magnetic flux component (Id* or Vd*) for the electric machine 117 and a commanded torque (Iq* or Vq*) component for the electric machine 117 based on estimated rotor speed and corresponding commanded torque, which may be stored in one or more reference look-up tables (e.g., 125, 130). The transition between the V/Hz control mode (of IF mode) and BEMF with accompanying FOC may be regarded as a shaft-alignment state, which can consider position alignment, speed alignment and torque alignment, among other things. FOC can use the direct-axis current vector to define magnetic flux (e.g., induced or established via the stator windings) of the electric machine 117 and the quadrature-axis current vector to define torque. In one embodiment, the first current controller 250 comprises an IF control module or an V/Hz control module; the second current controller 251 comprises a BEMF module with accompanying FOC; the first current controller 250 and the second current controller 251 are configured to cooperate with the FOC control module to achieve a smooth transition between V/Hz control or IF control and FOC (e.g., SVPWM control).

Volts per frequency (V/F) control mode, such V/Hz control mode, or an IF mode can be used to start up the machine (e.g., electric machine 117 (e.g., motor)) from zero speed of the rotor and once the rotor speed reaches a set threshold it can be configured to automatically transition from the position sensorless field oriented control, subject to the applicable control logic and/or software instructions of the associated data processing system. In the V/F control mode, the data processing system controls the rotor speed of a rotor based on a constant voltage/frequency ratio or a range of voltage/frequency ratio to maintain efficient operation of the electric machine 117 (e.g., motor).

Start-Up Transitions or Rotor Accelerating Transition Between the First Mode and the Second Mode For example, the limiter 254 further comprises an electronic data processor 264 that is configured to adjust or reset such that an initial (entry) commanded direct-axis current ($i_d^*$) and an initial (entry) commanded quadrature-axis current ($i_q^*$) in the second mode are aligned to match a final (exit) commanded direct-axis current and final (exit) commanded quadrature-axis current in the first mode during a start-up where an increasing rotational speed of the rotor changes to exceed the speed threshold for a transition between the first mode and the second mode.

At the mode transition instant (e.g., in the startup process or shutdown process), the essential goal is to avoid large instantaneous change of the stator-frame voltage commands ($v_{abc}^*$) applied to the alternating current (AC) terminals of the electric machine 117, which otherwise would tend to cause overcurrent fault. For the startup process or acceleration of the rotor, the proposed smooth transition can be achieved through the following three steps:

(1) The electronic data processor 264 or data processing system 120 determines a projection of the commanded first mode current vector command (e.g., IF current vector command) on a commanded second mode vector commanded (e.g., BEMF current command, or an FOC current command determined by rotor position or speed derived from BEMF) arising from an observer-estimated dq-axis reference frame (e.g., dq-axis hat reference frame), where the first mode current vector command comprises the commanded (average) second IF direct-axis current ($i_{d\_IF2}^*$) and the commanded second (average) IF quadrature-axis current ($i_{q\_LF2}^*$). Further, the commanded second IF direct-axis current ($i_{d\_IF2}^*$) and the commanded second (average) IF quadrature-axis current ($i_{q\_LF2}^*$) are observed after alignment of the rotor shaft (e.g., to the commanded quadrature-axis current, (e.g., $i_{q\_IF1}^*$=IAlign, $i_{d\_IF1}^*$=0)) in the first control mode.

2) At the mode transition instant or period (e.g., during one or more sampling intervals), the electronic data processor 264 or data processing system 120 is configured to reset torque generation module 105, the speed regulator 253, the current regulator 135, or the adjustment module 137 such that: (a) the first (initial or entry) commanded direct-axis current (id*) generated in the second mode (e.g., BEMF mode or FOC mode) substantially equals the (last or exit) commanded direct-axis current (id_IF2*) in the first mode (e.g., IF mode); and (b) (a) the first (initial or entry) commanded quadrature-axis current (iq*) generated in the second mode (e.g., BEMF mode or FOC mode) substantially equals the (last or exit) commanded quadrature-axis current (iq_IF2*) in the first mode (e.g., IF mode). Meanwhile, the position and speed estimator 114 provides the last (exit) estimated position value from the IF mode to be the first (initial or entry) position feedback in the BEMF mode (or BEMF mode with FOC) for the first transformation module 113.

3) A limiter 254 may comprise a first slew rate regulator; the first slew rate regulator applies respective the speed feedback used in the current regulator 135. Alone or together with limiter 254, the first transform module 113 or the position and speed estimator 114 incorporates, or is associated with, a second limiter (e.g., second slew rate regulator) that is configured to apply a slew rate limitation to the position feedback ($\widehat{\theta_{re}}$ or $\theta_{re}$ hat). In one embodiment, both the first slew regulator and the second slew rate regulator are enabled simultaneously at the mode transition instant or transition period (e.g., over one or more sampling intervals).

The above transition process between the first mode and the second mode may be complemented by one or more of the following examples, which may be applied separately or cumulatively.

Under a first example, in the first mode to second mode (e.g., the IF-BEMF mode) transition, in the position and speed estimator 114 or following the position and speed estimator 114 prior to application of the position of the angular position to the first transformation module 113, a low-pass filter is used to smoothen the position change at the mode transition instant. Although the first example decreases the possibility of the overcurrent fault, it can remain vulnerable to cause the overcurrent fault, unless it also addresses or limits the change of the speed feedback and the current command at the mode transition instant.

Under a second example, the current regulator 135 or in the limiter 254 controls or limits the commanded quadrature-axis current, iq*, to gradually decrease to a small value before the mode transition between the first mode and the second mode to avoid a potential overcurrent fault. However, the gradual decrease in the commanded quadrature-axis current may be too slow for certain practical or dynamic operating conditions for electric machines 117 (e.g., starter motor for an internal combustion engine).

In a third example, the torque controller 257 is configured to dynamically change the rotating speed of the current vector command, which may help to increase the robustness of the sensorless startup. Further, voltage sensors of the alternating current terminals (180a, 180b, 180c) of the electric machine 117 may be used to provide additional observed voltages for control of the inverter switching circuit 188, where the position and speed estimator 114 may be replaced by a position, speed, and torque estimation module that provides observed position, $\widetilde{\theta_{re}}$; observed speed, $\widetilde{\omega_r}$; and observed torque to the torque controller 257.

In a fourth example, torque regulation is applied to increase the IF control efficiency by adjusting the magnitude of commanded quadrature-axis current (iq*) through the torque regulation.

Shut-Down or Stop Transition or Decelerating Rotor Transition from a Second Mode to a First Mode During the stop or shut-down process from the second mode (e.g., BEMF mode or FOC BEMF mode) to the first mode (e.g., IF mode or V/Hz mode), the electronic data processor 264 may be configured to enable/disable regeneration braking operation, where the default is to enable regenerative braking operation. The position and speed estimator 114 estimates the rotor speed (e.g., electrical rotor speed and/or mechanical rotor speed) to determine when the estimated speed is lower than the preset speed threshold of the rotor for the transition from the second mode to the first mode (V/Hz or current-frequency mode (IF)). In the mode transition instant or during a transition period (e.g., of one or more sampling intervals), the electronic data processor 264 or data processing system 120 limits, reduces or constrains the instantaneous change of the commanded voltages ($V^*_{abc}$) to the inverter, via the current regulator 135 and the PWM generation module 112. For example, in the mode transition instant or period, the electronic data processor 264, data processing system 120, co current regulator 135, or adjustment module 137 limits, reduces or constrains the instantaneous change of the commanded voltages ($V^*_{abc}$) to the inverter to be less than or equal to a maximum instantaneous change of the commanded voltages ($V^*_{abc}$).

In one embodiment, the electronic data processor 264, current regulator 135 or limiter 254 is configured to limit of the instantaneous change or maximum instantaneous change during the stopping of the rotor or shutdown of the electric machine 117 (e.g., approaching a stop or zero rotor mechanical rotational speed). For example, to limit of the instantaneous change or maximum instantaneous change during the stopping of the rotor or shutdown of the electric machine 117 (e.g., approaching a stop or zero rotor mechanical rotational speed): (1) the electronic data processor 264 or the data processing system 120 is configured to reset or adjust the first (initial or entry) speed and position commands (which are used as the feedback signals in the IF mode) in the IF mode to have the same values as the last (final or exit) estimated speed and estimated position in the BEMF mode (e.g., BEMF with FOC); (2) the electronic data processor 264 and the data processing system 120 is configured to set the current commands in the IF mode to have the same values of the last (exit or final) current commands in the BEMF mode for a configurable duration before the electronic data processor 264 or the data processing system 120 is configured to decrease the current commands to zero.

During stopping of the rotor or shutdown of the electric motor, the electronic data processor 264 or the data processing system 120 can create an extra duration to extend potentially the braking torque in the IF mode to decelerate the motor more quickly (than otherwise possible) by limiting the instantaneous change or maximum instantaneous change during the stopping of the rotor or shutdown of the electric machine 117 (e.g., approaching a stop or zero rotor mechanical rotational speed). In one configuration, once the slewed speed command in the IF mode reaches or zero, as the final stage of the stopping process or shut down process, the electronic data processor 264 or the data processing system 120 activates one or more switches to ground the three phase terminals or alternating current terminals, which can ground the stator windings, of the electric machine 117. The grounded stator windings of a three-phase, synchronous, permanent magnet electric machine 117 are sometimes referred to as the three-phase short feature. For instance, the method and system of this disclosure can use the above three-phase short feature to hold or maintain (or to transition quickly to) a fixed or stationary position (e.g., on-demand, stalled position) of the rotor of the electric machine 117.

The overall sensorless deceleration/stopping scheme is well-suited to sue the available synchronous permanent magnet (SPM) braking torque to decelerate rapidly, while maintaining the ability to smoothly transition between modes and to avoid the overcurrent fault. The robust and fast stop is desirable for mowing applications, among other agricultural, forestry, construction and industrial applications. The system and method described in this document can achieve one-step transition between the first mode and the second mode (e.g., BEMF mode to the IF mode) to avoid overcurrent fault and to avoid or to reduce transient current at the mode transition instant in the stop process.

Figure 4:
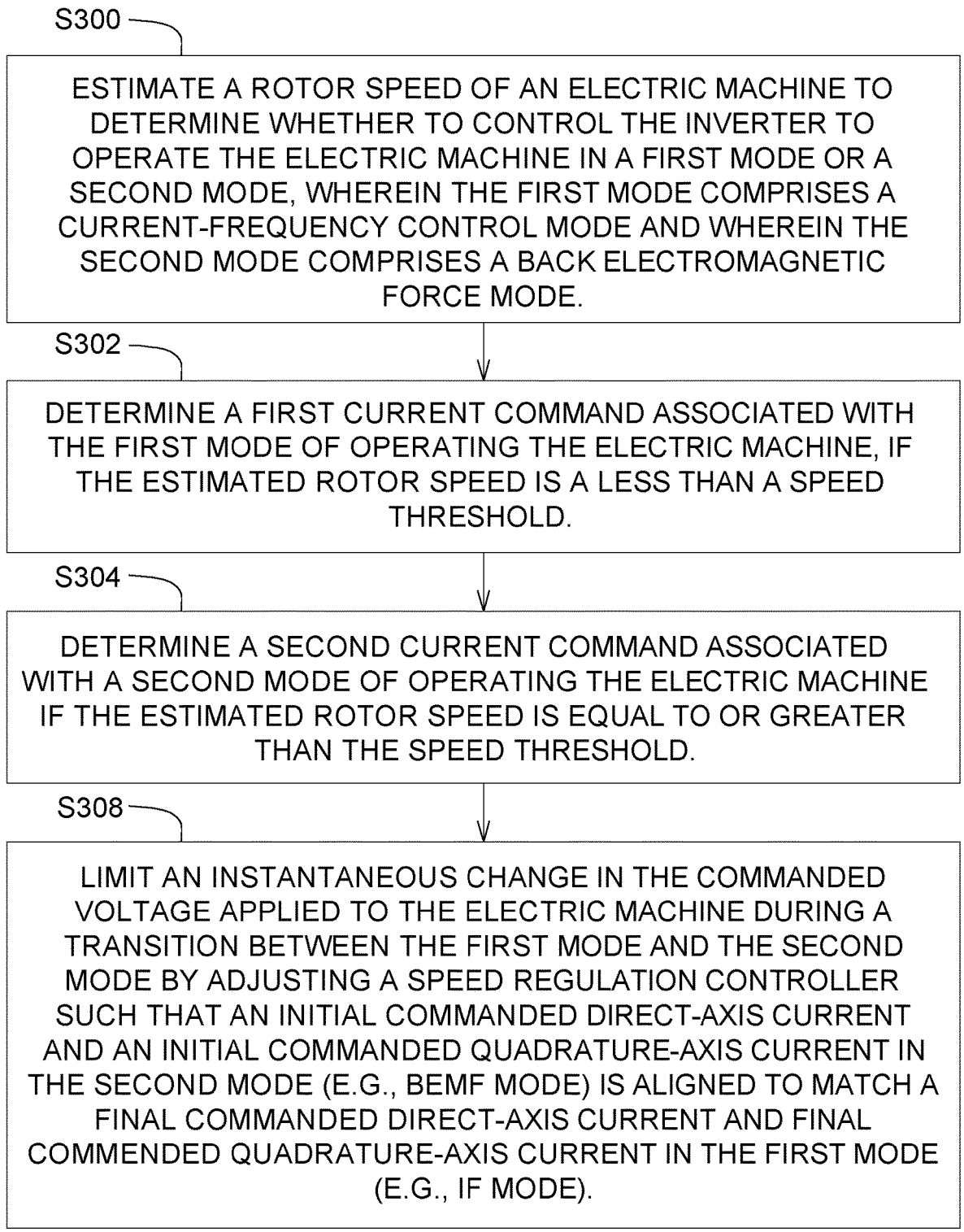
FIG. 4 is a second embodiment of a flow chart of a method for controlling an electric machine with robust start-up and stop modes.

The method of FIG. 4 is similar to the method of FIG. 3, except the method of FIG. 4 replaces step S306 with step S308. Like reference numbers in FIG. 3 and FIG. 4, or in any set of drawings, indicate like elements.

In step S308, an electronic data processor 264 or a limiter 254 limits the instantaneous change in the commanded voltage applied to the electric machine 117 during a transition between the first mode and the second mode by adjusting an electronic data processor 264, speed regulator 253, or current regulator 135 such that an initial commanded direct-axis current and an initial quadrature axis current in the second mode (e.g., BEMF mode) is aligned to match (e.g., or to substantially equal or to substantially equal less a target tolerance/variance) a final commanded direct-axis current and final commanded quadrature-axis current in the first mode (e.g., IF mode).

Step S308 may be carried out by the electronic data processor 264, controller 266 or current regulator 135 in accordance with various techniques, which may be applied separately or cumulatively. Under a first technique, the electronic data processor 264, the controller 266 or regulator adjusts or resets the commanded current such that an initial (entry) commanded direct-axis current ($i_d^*$) and an initial (entry) commanded quadrature-axis current ($i_q^*$) in the second mode is aligned to match a final (exit) commanded direct-axis current and final (exit) commanded quadrature-axis current in the first mode during a start-up where an increasing rotational speed of the rotor changes to exceed the speed threshold for a transition between the first mode and the second mode.

Under a second technique, the electronic data processor 264, the controller 266 or the current regulator 135 determines the final commanded direct-axis current ($i_{d\_IF2}^*$) and final commended quadrature-axis current ($i_{q\_IF2}^*$) in the first mode (IF mode) with respect to the following equations:

$$\widehat{\theta_L} = \widehat{\theta_e} - \theta^*_e$$

$$i^*_{d\_IF2} = i^*_{d\_IF1} \cdot \cos \widehat{\theta_L} = I_{q\_RampUp} \cdot \cos \hat{\theta}_L$$

$$i^*_{q\_IF2} = i^*_{q\_IF1} \cdot \sin \widehat{\theta_L} = I_{q\_RampUp} \cdot \sin \hat{\theta}_L$$

where $\widehat{\theta_L}$ ($\theta_L\_$hat) is the average angular position difference between the true angular position of the rotor of the electric machine 117 or an average observed angular position $\widehat{\theta_e}$ ($\theta e\_$hat) and the commanded angular position $\theta^*_e$ of the rotor of the electric machine 117; $i_{d\_IF1}^*$ is the commanded direct-axis current in the commanded d-q-axes-reference frame, $i_{q\_IF1}^*$ is the commanded quadrature-axis current in the commanded d-q-axes-reference frame; $i_{d\_IF2}^*$ is the commanded direct axis current in the estimated d-q-axes-hat reference frame that represents average commanded direct axis current, and; $i_{d\_IF2}^*$ is the commanded direct axis current in the estimated d-q-axes-hat reference frame that represents average commanded direct axis current, and $I_{q\_RampUp}$ is the quadrature axis component of the ramp-up current for the first mode.

Under a third technique, the electronic data processor 264, the controller 266 or the current regulator 135 limits of the instantaneous change according to the following: First, the position and speed estimator 114, or a position observer separate from or integral with the position and speed estimator 114, estimates, an electrical angle of the rotor based on the last (exit) electrical angular position ($\theta e\_$hat) in the first mode (IF mode) as the first (entry or initial) position feedback (as proxy or substitute for observed electrical angle; second, the electronic data processor 264, or the data processing system 120 or first transform module 113 is configured to: (a) apply an observed electrical angle of the rotor to the first transform (e.g., Park transform) to set an initial quadrature axis current (iq) feedback and direct-axis current (id) feedback in the second mode (BEMF mode), and/or (b) to provide set an initial quadrature axis current (iq) feedback and direct-axis current (id) feedback in the second mode (BEMF mode) based on an observed electrical angle of the rotor inputted to first transform module 113.

Under a fourth technique, the electronic data processor 264, the controller 266 or the current regulator 135 limits of the instantaneous change according to the following: First, electronic data processor 264, the current regulator 135 or a limiter 254 is configured to limit a slew rate of the commanded current (d-q axes currents) in the first mode and second mode based on a speed feedback (e.g., estimated electrical speed of rotor) used in complex vector current regulator (CVCR) 259; second, a second limiter (e.g., incorporated in the position and speed estimator 114, the first transform module 113, or the second transform module 140) is configured to limit a change in position feedback used for a second transform from a commanded d-q axes voltage reference frame to a commanded three-phase voltage reference frame (vabc*).

Under a fifth technique, during start-up of rotation of the rotor from a stationary state or rest in the first mode, the electronic data processor 264, the controller 266 or the current regulator 135 generate an alignment quadrature-axis current for an alignment time; second, after the alignment time, in a ramp-up time in the first mode, the electronic data processor 264, the controller 266 or the current regulator 135 generates a ramp-up quadrature-axis current until the speed threshold, of the rotor of the electric machine 117, is attained.

Under a sixth technique, during the ramp-up time having a first slew rate that is less than a second slew rate, the electronic data processor 264, the controller 266 or the current regulator 135 applies the first slew rate if the commanded rotor electrical speed is less than a low speed threshold.

Under a seventh technique, during the ramp-up time having a first slew rate that is less than a second slew rate, the electronic data processor 264, the controller 266 or the current regulator 135 applies the second slew rate, which is associated with the second mode or commanded rotor electrical speed in the first mode, if the commanded rotor electric speed that is greater than or equal to the low speed threshold.

Figure 5:
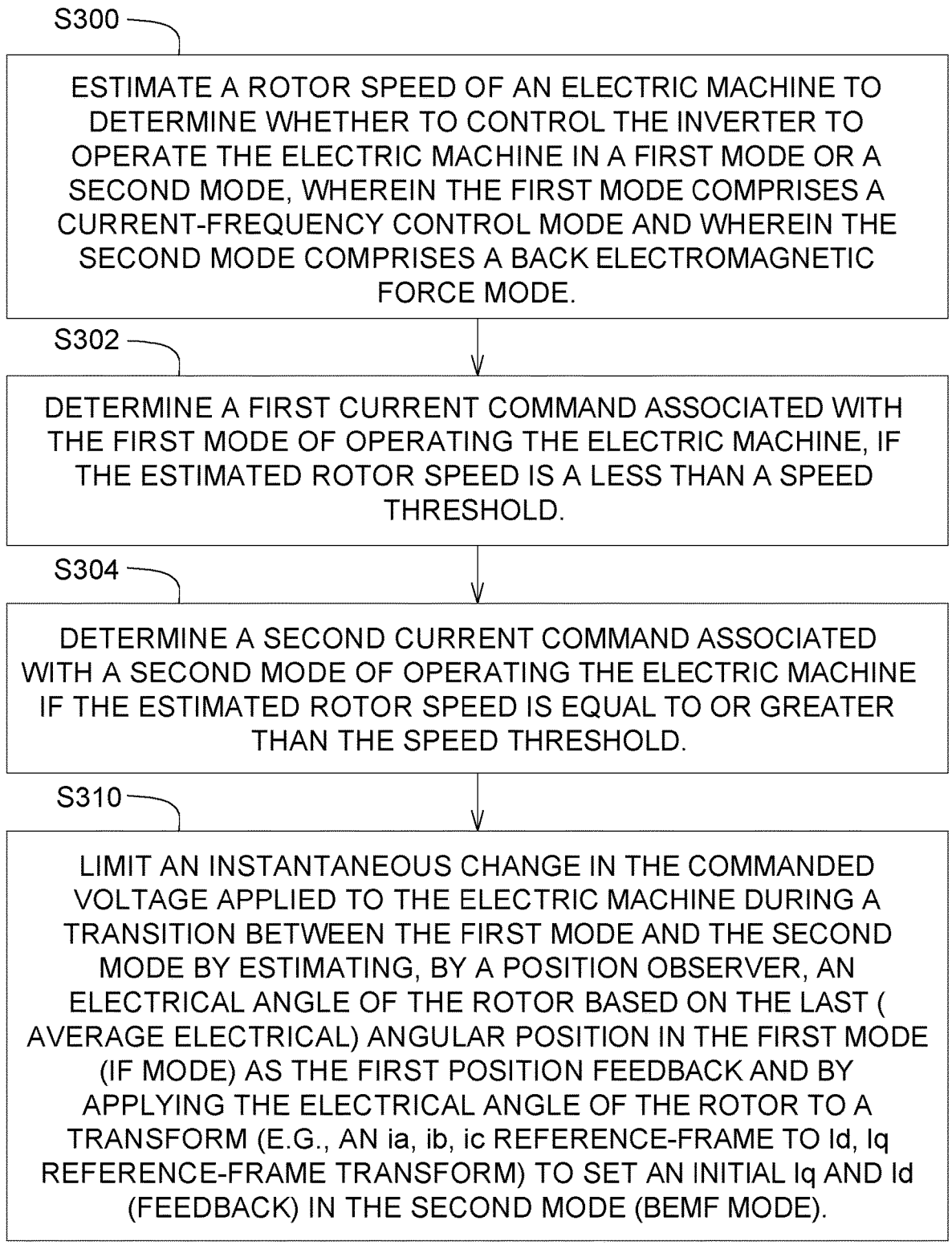
FIG. 5 is a third embodiment of a flow chart of a method for controlling an electric machine with robust start-up and stop modes.

The method of FIG. 5 is similar to the method of FIG. 3, except the method of FIG. 4 replaces step S306 with step S310. Like reference numbers in FIG. 3 and FIG. 4, or in any set of drawings, indicate like elements.

In step S310, an electronic data processor 264 or a limiter 254 limits the instantaneous change in the commanded voltage applied to the electric machine 117 during a transition between the first mode and the second mode by estimating, by a position observer or a position and speed estimator 114, an electrical angle of the rotor based on the last (average electrical) angular position in the first mode (IF mode) as the first position feedback and by applying the electrical angle of the rotor to a transform (e.g., an ia, ib, ic reference-frame to Id, Iq reference frame transform) to set an initial Iq and Id (feedback) in the second mode (BEMF mode or BEMF mode with FOC).

Figure 6:
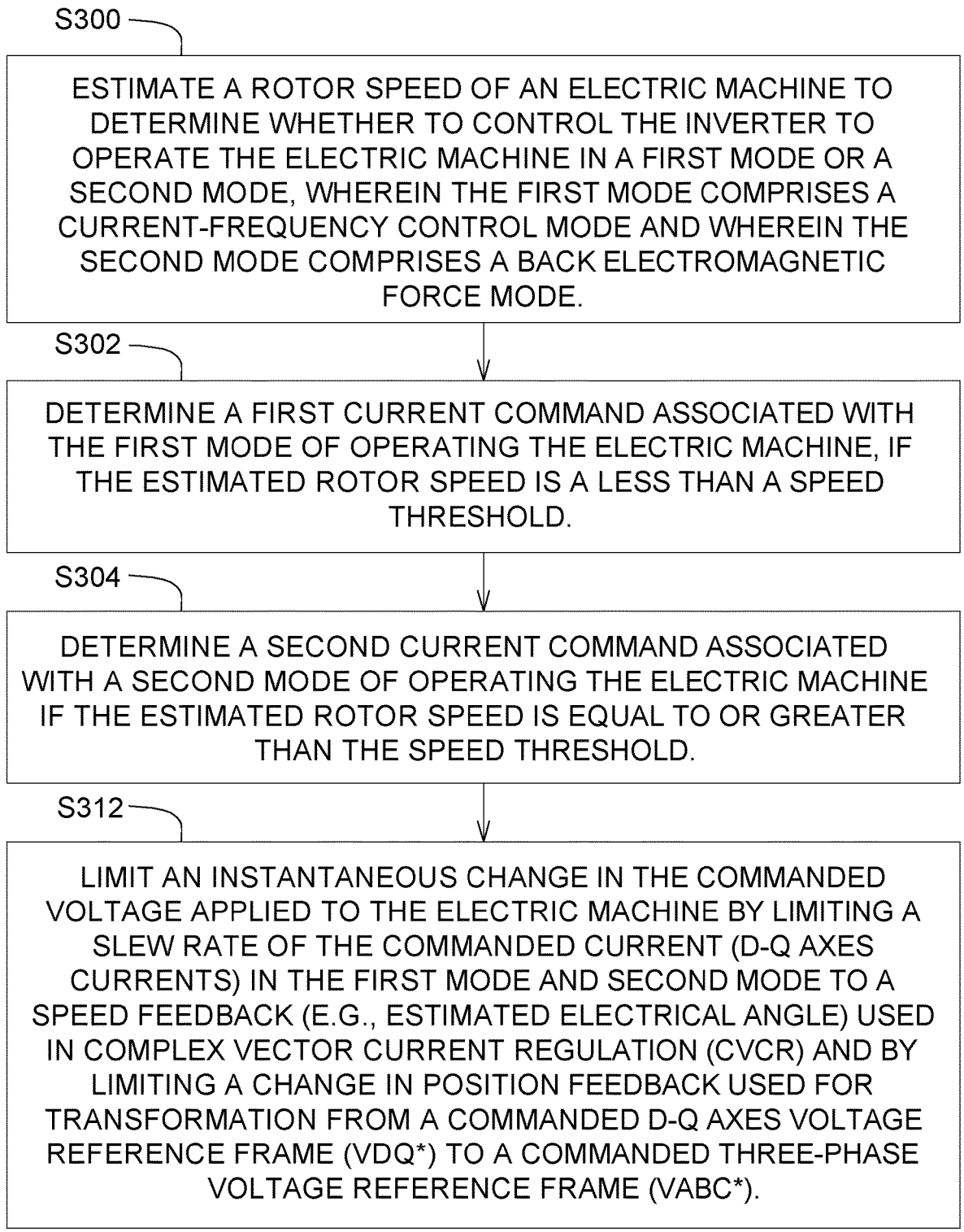
FIG. 6 is a fourth embodiment of a flow chart of a method for controlling an electric machine with robust start-up and stop modes.

The method of FIG. 6 is similar to the method of FIG. 3, except the method of FIG. 6 replaces step S306 with step S312. Like reference numbers in FIG. 3 and FIG. 4, or in any set of drawings, indicate like elements.

In step S312, an electronic data processor 264 or a limiter 254 limits the instantaneous change in the commanded voltage applied to the electric machine 117 during a transition between the first mode and the second mode by limiting or adjusting a slew rate of the commanded current (commanded direct axis current, commanded quadrature axis current) in the first mode and the second mode to a speed feedback (e.g., estimate electric angle versus time) used in a complete vector current regulator (CVCR) 259 and by limiting a change in position feedback used for transformation from a commanded d-q axes voltage reference frame (e.g., $V_{DQ}^*$ or vd* and vq*) to a commanded three-phase voltage reference frame (e.g., $V_{ABC}^*$ or va*, vb* and vc*).

In one configuration, the electric machine 117 may comprise synchronous permanent magnet (SPM) electric machine 117. During the start-up process for the rotor of the electric machine 117, the first mode (e.g., voltage per frequency (V/f) control mode or a current-frequency control (IF) mode) first aligns the rotor magnetic pole to a stationary current vector or non-rotating current vector. As used throughout this document, a current control mode may represent a frequency-dependent current control mode or current-frequency (IF) control. After attaining acceptable alignment between the rotor and the stationary current vector, the electronic data processor 264 or current regulator 135 determines a rotational current vector by commanding the magnitude and the speed of the current vector, respectively. For example, current magnitude can be set to be close to a target current, such as the current limit, while the speed is linearly increasing using the designed slew rate depending on a number of factors including the torque capability of the electric machine 117, system inertia, damping, load profile, among other possible factors.

Meanwhile, even during the start-up process, while the electric motor is operating in a first mode (e.g., V/Hz of IF mode), to facilitate a potential future transition to a second mode (e.g., BEMF mode or BEMF mode with FOC), the BEMF-based position observer in the position and speed estimator 114 is running simultaneously in the background to provide estimated rotor position and speed and/or to support a smooth transition between the first mode and the second mode. For example, while operating in the first mode if, or once, the commanded (V/F or current-frequency (IF) control) mode speed and the estimated speed are both above a preset speed threshold, the sensorless control scheme changes from the first mode (e.g., V/F or current mode) to the second mode (e.g., BEMF mode).

First Mode (IF Mode) Control

In a first mode (e.g., IF control mode), the electronic data processor 264, the data processing system 120, the current regulator 135 or the current vector current regulator 259 (CVCR), is configured to regulate current by creating a rotating current vector (e.g., Id*, Iq*) that drives the rotor to follow a one or more stages in succession. In a first stage or first state of start-up, the electronic data processor 264, the data processing system 120, the current regulator 135 or the current vector current regulator (CVCR) 259 is configured to align the commanded quadrature axis with the direct-axis, consistent with FIG. 11. In a second stage or second state of start of rotation of the rotor (e.g., startup process), the data processing system 120, the current regulator 135 or the current vector current regulator (CVCR) 259, is configured to select a proper acceleration profile (e.g., a ramp function of rotor position versus time) of the current vector in accordance with the first mode (e.g., IF mode).

In one embodiment, in the first mode (e.g., IF mode), the magnitude and frequency of each current vector can be varied individually or collectively, by IF (current-frequency) control commands, which can be expressed in the d-q axes reference frame. Under IF control, the current regulation loop is generally a closed loop, but the speed regulation loop is generally an open loop. IF control is intended to extend the speed range of the rotor of the electric machine 117 for position sensorless operation. Meanwhile, in the second mode (e.g., the BEMF-based sensorless control mode) generally (only) works in medium-to-high speed of the rotor of the electric machine 117. Therefore, the IF control is generally used as an start-up stage or intermediate stage at the low speed and stall condition, when the BEMF-based sensorless control is not applicable.

The sensorless control system and method is well-suited to provide a smooth transition between the first mode (e.g., V/Hz mode or IF mode) and the second mode (e.g., BEMF or BEMF FOC mode), which otherwise would cause slow dynamics and/or overcurrent fault at the mode transition instants. Further, the sensorless control system and method comprise a responsive startup process, a responsive stop process, or both that can achieve the above smooth mode transition with potentially fast (e.g., real-time) dynamics for startup and stop process of the SPM position sensorless control in the context of a vehicle or off-road work vehicle that is suitable for agricultural, construction, forestry, or road repair or maintenance tasks (e.g., mowing).

IF Startup Process

Figure 10:
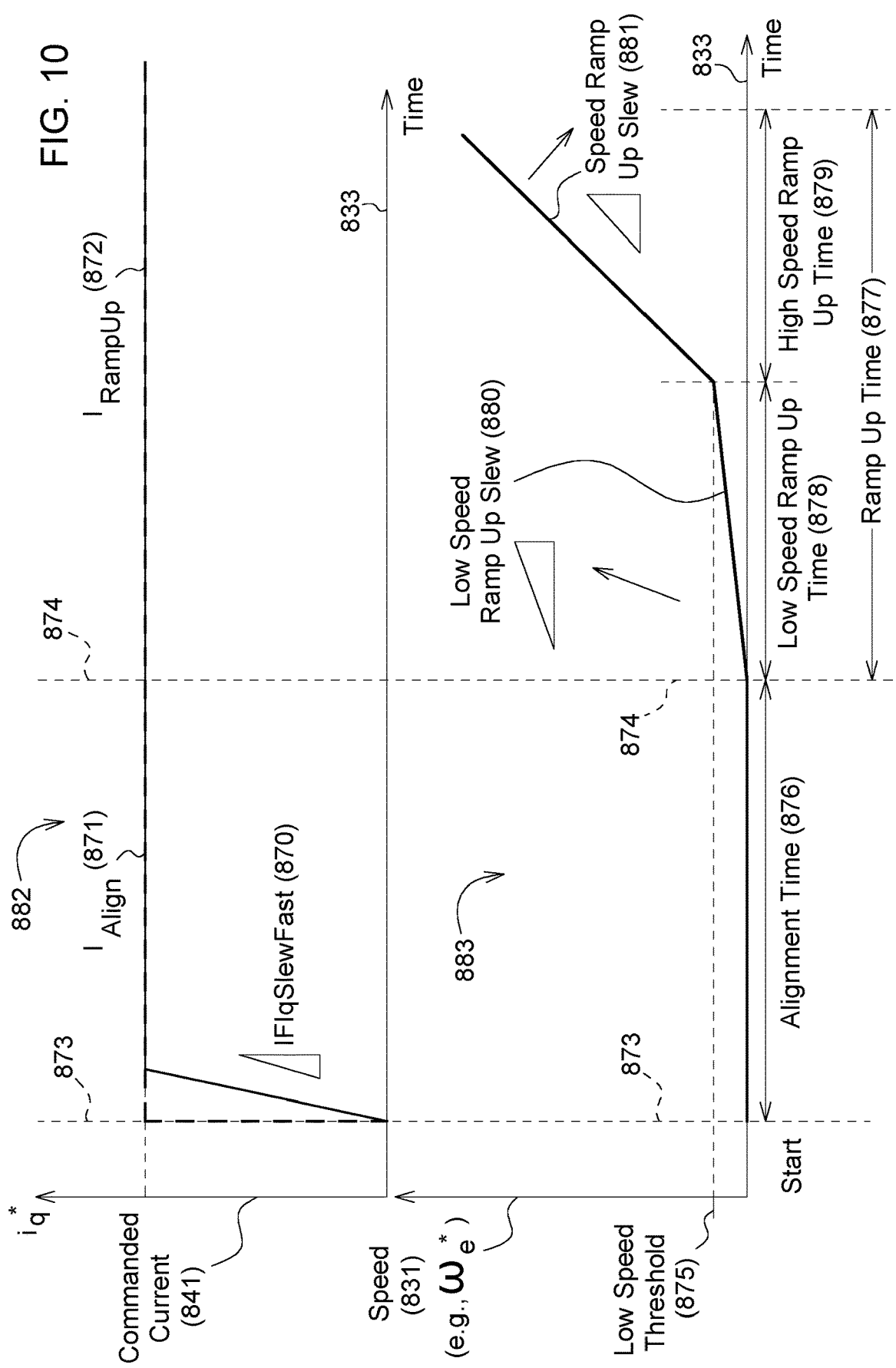
FIG. 10 illustrates a start-up process of the rotation of a rotor of an electric machine via an upper graph of commanded quadrature-axis current versus time and a lower graph of electrical rotor speed versus time for a common time scale for the upper graph and lower graph.

FIG. 10 illustrates the startup process of the electric machine 117, such as startup process from stopped rotor or rotor at rest that accelerates within a first mode (e.g., IF mode) and/or from a first mode to a second mode (e.g., BEMF mode with field oriented control (FOC)) at transition time (e.g., instant or time period comprising one or more sampling intervals) or third time 884 associated with speed threshold 875. FIG. 10 includes an upper graph 882 of commanded quadrature-axis current 841 (e.g., $i_q^*$) versus time and a lower graph 883 of commanded electrical rotor speed 831 (e.g., $\omega_e^*$) versus time for a common time scale 833 for the upper graph 882 and lower graph 883.

The first mode (e.g., IF startup mode) has multiple possible stages or states: (1) first state or alignment stage for a corresponding alignment time 876 between a first time 873 and a second time 874, (2) second state or ramp-up stage, which may occur during a ramp up time 877, between the second time 874 and a fourth time 885 and (3) third state or switching stage. In the third state, the data processing system 120 switches the from the first mode (e.g., IF or V/Hz) to the second mode (e.g., BEMF-based sensorless control). In one configuration, FIG. 10 illustrates the commanded current 841 ($i_q^*$) and the commanded electrical rotor speed 831, or its change, in the IF mode at startup before transitioning (e.g., time 884) to the BEMF mode over time 833. For example, in the upper graph 882 of FIG. 10, some parameters describe the characteristics of the change of commanded quadrature current 841, $i_q^*$ in magnitude and frequency during the startup.

Alignment Stage

In the first state or alignment stage during the alignment time 876 that is illustrated in FIG. 10, the electronic data processor 264 or current regulator 135 generates a commanded quadrature-axis current 841 set to an alignment quadrature axis current 871 (e.g., $I_{Align}$), $i_q^*$, where $i_q^*=I_{Align}$, $i_d^*=0$, $\omega_e^*=0$; where the commanded rotor position of the electric machine 117 is equal to zero degrees (e.g., $\theta^*=0$). Basically, the $I_{Align}$ (871) refers to a fixed or non-rotating alignment current vector and the rotor of the electric machine 117 will eventually align with the fixed or non-rotating alignment current vector. For example, the fixed or non-rotating alignment current vector may be associated with a stationary stator magnetic field (or a respective rotor-stator magnetic pole pair), although it is possible to align with a rotating alignment current vector associated with the stator magnetic field.

Figure 11:
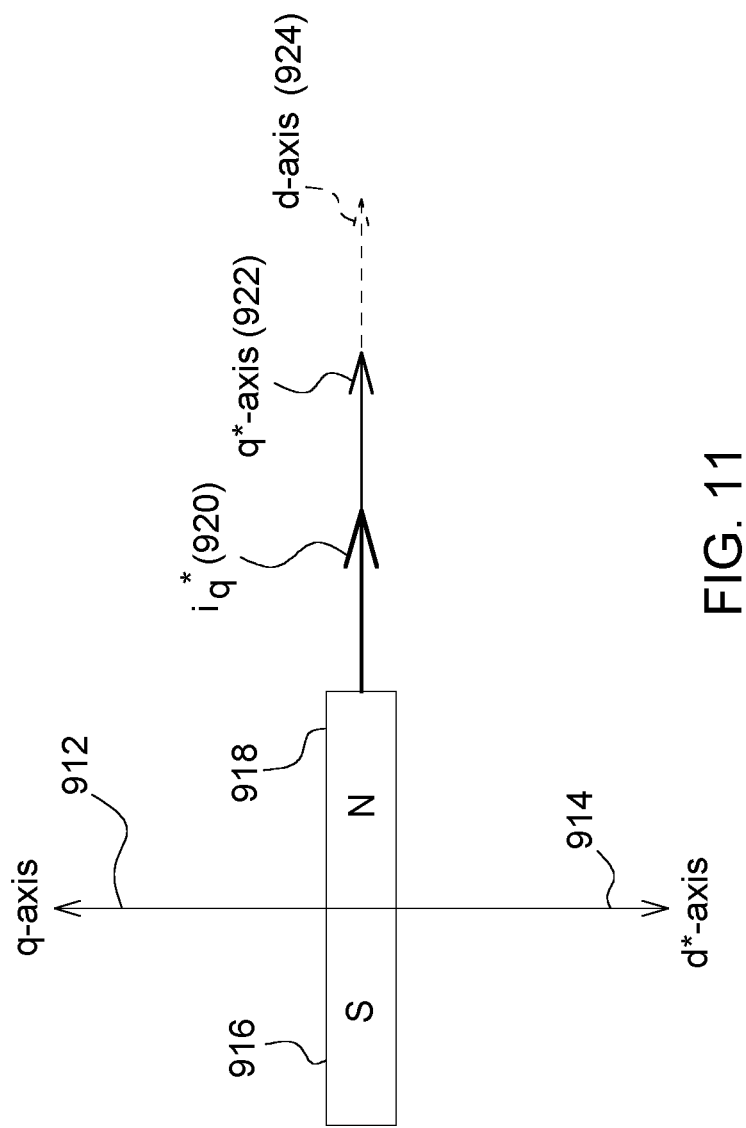
FIG. 11 is a graph of the rotating d-q axes frame in which the commanded quadrature-axis is aligned with the d-axis of the rotating d-q axes frame, with respect to a rotor-stator pole pair.

FIG. 11 is a graph of the rotating d-q axis frame in which the commanded quadrature-axis current 920 (iq*) of the rotor of the electric machine 117 is aligned with the commanded quadrature-axis (current) 922 and the direct-axis 924 (current) of the d-q axis reference frame (e.g., stationary or nonrotating d-q reference frame of a stator of the electric machine 117) for the alignment stage of FIG. 10. Because the observed or true d-axis 924 (e.g., reference stator d-axis axis) of an electric machine 117 (e.g., synchronous permanent magnet machine (SPM)) is defined to be along an illustrative rotor magnet north pole direction 918, once the rotor is aligned with the commanded q*-axis 922, the commanded dq*reference frame (914, 922) is 90 electrical degrees behind the true dq-reference frame, which is represented by the q-axis 912 and the d-axis 924, as shown in FIG. 11. Here, the electronic data processor 264 or current regulator 135 aligns the rotor of the electric machine 117 with the commanded alignment current vector (e.g., $I_{Align}$) while the implementation of the current vector is arbitrary and could be achieved in many other ways than the one implemented in FIG. 10 and FIG. 11. For example, in an alternative embodiment, the electronic data 264 processor or current regulator 135 could command $i_q^*=0$, $i_d^*=I_{Align}$, $\omega_e^*=0$ and let rotor align with $i_d^*$, as long as such alignment is known and tracked throughout the control process.

In one configuration, the commanded alignment current vector, $I_{Align}$, is usually set to be to a maximum current based on an inverter phase maximum output current rating or based on the maximum output current of the power inverter switching circuit 188 (e.g., power transistor or power switching transistor module of the inverter) the to achieve fast alignment or the rotor of the electric machine 117 to the direct-axis of the electric machine 117.

In some configurations, the current regulator 135 may comprise a slew limiter 254 to facilitate application of commanded quadrature axis current ($i_q^*$) at the beginning of the startup during the ramp up time 877 as shown in FIG. 11. As illustrated, the electronic data processor 264, current regulator 135 or electronic data processing system 120 provides a low speed ramp-up slew 880 during low-speed ramp up time 880 to limit the commanded electrical rotor speed; the electronic data processor 264, current regulator 135 or electronic data processing system 120 provides a high speed ramp-up slew 881 during high-speed ramp up time 881 to limit the commanded electrical rotor speed.

One or more slew limiters, such as the slew limiter 254, can help to achieve good alignment sooner in the certain applications, such as agricultural, lawn care, mowing, construction or forestry applications, road maintenance and repair, or when a blade is connected to the rotor shaft of the electric motor. Without the limiter 254 (e.g., slew limiter), the current regulator 135 could potentially generate a transient change or an abrupt change commanded quadrature axis current (e.g., delta $i_q^*$) could make the rotor (with the blade) oscillate around the alignment position, where the oscillation diminishes or damps out during a damping interval (e.g., in a few seconds).

FIG. 11 shows a d-q coordinate system for a permanent magnet synchronous machine (PMSM) where the rotor d-q reference frame is illustrated with respect to the d-q reference frame, such as stator reference frame or a true or real reference d-q frame. FIG. 11 illustrates a rotor with two or more magnetic poles (916, 918) secured to the rotor, where N indicates a North pole 918 and S indicates a South pole 916. In one example, the commanded rotor quadrature-axis current 920 (e.g., iq*) rotates with respect to the corresponding (stationary or observed) stator direct-axis current 924, where the rotor position of the commanded rotor quadrature-axis current 922 is offset by an angular position of approximately 90 degrees (e.g., negative 90 degrees) from the stator quadrature-axis current 912. The commanded rotor quadrature-axis current 920 (iq*) is generally orthogonal to the commanded rotor direct-axis current 914; hence to the commanded rotor direct-axis current (id*) (not shown) has the same offset of angular position of approximately 90 degrees (e.g., negative 90 degrees) with respect to the stator-direct axis. Likewise, the stator quadrature-axis current (iq) is generally orthogonal to the stator direct axis current 912 (id).

Figure 7:
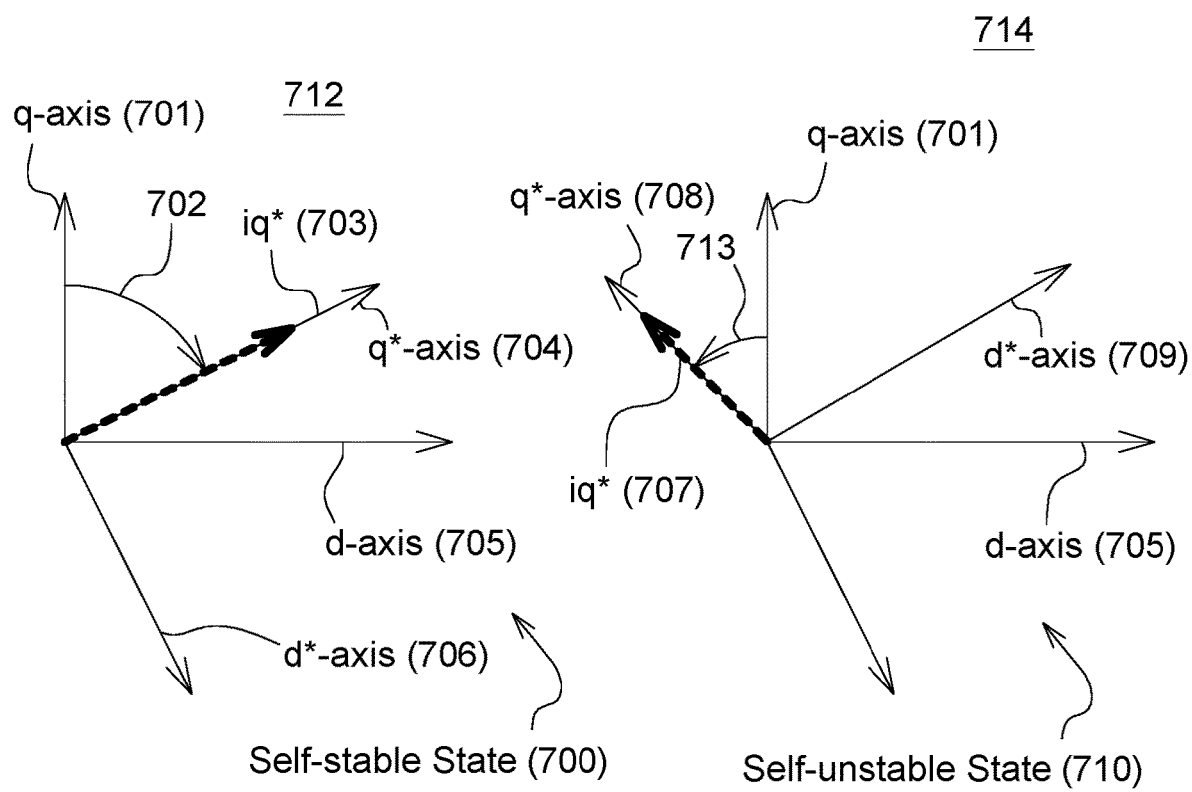
FIG. 7 is an illustrative example of a self-stable commanded current vector in a first graph of rotating d-q reference frame and a self-unstable commanded current vector in a second graph of a rotating d-q reference frame.

FIG. 11 illustrates commanded dq*-frame and reference (real or true) dq-frame at alignment. Proper alignment is critical for IF startup to operate at a self-stable state 700 (e.g., stable equilibrium or self-stable operating state), rather than a self-unstable operating state 710 (unstable equilibrium), as shown in FIG. 7. In FIG. 11, the projection of iq* on the true q-axis gives the true electromagnetic torque produced by the electric machine 117. Assume the angular offset or position difference between the dq-reference frame and dq*-reference frame is $\theta_L$. Thus, $$\theta_L = \theta_{dq} - \theta_{dq}^*, \quad (1)$$

$$T_e = K_t i_q^* \cos \theta_L, \text{ where:} \quad (2)$$

$\theta_L$ is the angular position difference between the observed angular position $\theta_{dq}$ (e.g., true or actual position) and the commanded angular position $\theta_{dq}^*$;

$T_e$ is the electromagnetic torque associated with the electric machine 117;

$K_t$ is a torque constant for the electric machine 117; and $i_q^*$ is the commanded quadrature-axis current applied to the electric machine 117.

Throughout the document, the following definitions apply:

BEMF is Back electro-magnetic force;

$T_e$ is electromagnetic torque produced by the electric machine 117;

$T_L$ is load torque;

CVCR 259 is Complex vector current regulation;

$^A$ superscript asterisk (*) means the item is a command;

$\theta_{dq}$ is an angular position of d-axis of the true dq-frame;

$\theta_{dq}^*$ is an angular position of d-axis of the commanded dq-frame;

J is inertia;

$K_t$ is a torque constant for the electric machine 117;

PP is a pole pair number;

$\omega_e$ is synchronous dq-frame electrical speed in rad/s; and $\omega_r$ is rotor electrical speed in rad/s.

FIG. 7 is an illustrative example of a self-stable commanded current vector in a first graph 712 of rotating d-q reference frame and a self-unable commanded current vector in a second graph 714 of a rotating d-q reference frame. For the rotating d-q reference frame in the first graph 712, the q-axis 701 is perpendicular to the d-axis 705; for the rotating commanded d-q* reference frame, the q*-axis 704 is perpendicular to the d*-axis. As illustrated, the commanded q*-axis current, $i_q^*$, 703 is substantially or generally aligned with the commanded q*-axis current, as described in the alignment stage in this document.

For the rotating d-q reference frame in the second graph 714, the q-axis 701 is perpendicular to the d-axis 705; for the rotating commanded d-q* reference frame, the q*-axis 704 is perpendicular to the d*-axis. As illustrated, the commanded q*-axis current, $i_q^*$, 708 is substantially or generally aligned with the commanded q*-axis current, as described in the alignment stage in this document.

In the self-stable state 700, a limited change of load disturbance or speed command can be self-adjusted by the system to stabilize at a new steady-state condition. For example, if both dq-frame and dq*-frame rotate at approximately the same speed (e.g., counter-clockwise) and the two reference frames have an angular position difference of $\theta_{L1}$ (702), where the true (or observed) dq-frame is ahead of the (commanded) dq*-frame by $\theta_{L1}$. Then, if a load is added to the rotor of the electric machine 117, the rotor true speed as well as the rotation of the true or observed dq-frame (701, 705) will slow down, while the dq*-frame (704, 706) stays the same; therefor, $\theta_L$ will decrease. As a result, $T_e$ will increase based on Equation 2 and will eventually bring the rotor speed back to the commanded speed again. Finally, the electric machine 117 will be stabilized in the self-stable state 700, at the original speed with a smaller $\theta_L$, such as $\theta_{L2}$, where $\theta_L = \theta_{L2} < \theta_{L1}$ such that the newly generated torque will balance the increased load.

For the self-unstable state 710, it is self-unstable which means any disturbance to a self-unstable steady-state operating condition will make the control or angular position difference drift away and it will not revert back to a self-stable state 700 over time.

The self-stable state or self-stable operating region for positive speed (counter-clockwise) is when $\theta_L$ is between 0 to 90 degrees. The IF control is most stable at $\theta_L$=90 degrees and is least stable at $\theta_L$=0 degree. The IF control stability decreases as $\theta_L$ decreases from 90 degrees to 0 degree, and the control becomes unstable if $\theta_L$ (713) becomes negative as illustrated in the second graph 714 of FIG. 7. Accordingly, the electronic data processor 264, the current regulator 135, and the data processing system 120 are configured to determine an alignment current vector that is consistent with the most stable position, or the self-stable state 700, as opposed to the self-unstable state 710.

Ramp Up

At ramp-up stage or ramp-up state, as illustrated in FIG. 11, the electronic data processor 264 or current regulator 135 generates the commanded quadrature axis current that is generally equal to the commanded alignment current, consistent with the following Equations 2.1, 2.2, and 2.3:

$$\text{commanded } i_q^* I_{RampUp}, \quad (2.1)$$

$$i_d^* = 0, \text{ and} \quad (2.2)$$

$$\omega_e^* = K_\omega^* \cdot t. \quad (2.3)$$

The position feedback used for the control of an electric machine 117 is equal to the integral of $\omega_e^*$. So basically, we command a rotating current vector with constant magnitude and a linearly increasing speed with respect to time. The slew rate of $\omega_e^*$ is $K_\omega^*$, which may be calculated by the following derivation of Equation 2.

First, the torque and speed relationship can be expressed by the following Equation 3:

$$T_e - T_l = \frac{J}{PP} \cdot \frac{d\omega_r}{dt}, \quad (3)$$

where $T_e$ is electromagnetic torque produced by the electric machine 117 (at the rotor shaft);

$T_L$, is load torque on the rotor shaft of the electric machine 117;

J is inertia of the electric machine 117 and the load that is mechanically coupled to the rotor shaft of the electric machine 117;

PP is a pole pair number; and $\omega_r$ is rotor electrical speed in rad/s.

In one configuration, the damping and static friction are included in the load torque, $T_L$, to facilitate the derivation of the load torque. Here, J inertia includes both the inertia of the electric machine 117 and the inertia from the application, such as the inertia of the blade for a mower. Then, based on the assumption of linear speed command of the IF control in the first mode, the following Equations 4 and 5 are applicable:

$$\omega_e^* = K_w^* \cdot t, \quad (4)$$

$$\theta_L = \int \omega_r dt - \int \omega_e^* dt, \quad (5)$$

where the above terms are defined above.

After integration of both sides of Equation 3 and applying Equation 2 for $T_e$, the following Equation 6 is obtained:

$$K_t \cdot i_q^* \cdot \cos\theta_{L\_ave} \cdot t - T_{L\_ave} \cdot t = \frac{J}{PP} \cdot \frac{d\omega_r}{dt} \quad (6)$$

where $\theta_{L\_ave}$ and $T_{L\_ave}$ are the average values of $\theta_L$ and $T_L$ during the integration interval. To the extent that the rotor speed, $\omega_r$, closely follows commanded electrical rotor speed, $\omega_e^*$, and Equation 4 is applied in Equation 6 to substitute for $\omega_r$, resulting Equation 7 is as follows:

$$K_w^* = PP \cdot \frac{K_t \cdot i_q^* \cdot \cos\theta_{L\_ave} - T_{L\_ave}}{J} \quad (7)$$

In one configuration, $T_{L\_ave}$ may be replaced by an estimated maximum load level or a previously recorded maximum load level or a historical maximum load for a work task of a corresponding vehicle that incorporates the data processing system, inverter and electric machine 117. With known PP and J of a given electric machine 117 as well as an expectation of the largest load value, $K_\omega^*$ is determined by $i_q^*$ and $\theta_{L\_ave}$.

As illustrated in the upper graph 882 of FIG. 10, to achieve fast startup, the command quadrature-axis current 841, $i_q^*$, is also usually set to be close to the current limit. For example, the CVCR 259, current regulator 135 or data processor 264 can set the commanded ramp-up current 872 ($I_{RampUP}$) as follows: $I_{RampUp} = I_{Align}$. On the other hand the offset in the angular rotor position, $\theta_{L\_ave}$ (e.g., between the commanded d-q axis and the observed d-q axis or d-$q_{hat}$ axis) can be determined by characterization of the electric machine 117 coupled to the data processing system 120, to achieve robust startup. To further help rotor catch up to, align with, or synchronize with the speed of the commanded current vector 841 at the beginning of the startup (e.g. rotor may need to get rid of some static friction at stall condition), during a low speed ramp up time period 878, the electronic data processor 264 or current regulator 135 first applies a low-speed ramp up slew rate 880 (or lower-speed ramp up slew rate) of the rotating current vector command or commanded electrical rotor speed 831, as shown on the lower graph 883 in FIG. 10. The low-speed ramp up slew rate 880 is lower than or less than a high speed ramp up slew rate 881. As best illustrated in FIG. 10, during a low speed ramp up time period 878, the electronic data processor 264 or current regulator 135 applies a low speed ramp up slew 880 until the commanded electrical speed 831 or the rotor exceeds a low speed threshold 875 (e.g., speed threshold for transition between the first mode and the second mode). After the low speed ramp up time period 878, or after the commanded electrical speed of the rotor, the electronic data processor 264 or current regulator 135 applies a high speed ramp up slew 881, which can be applied (e.g., post-transition from the first mode) in the second mode (e.g., BEMF mode with FOC). The third time 884 indicates the boundary or transition between the low speed ramp-up time 878 and the high-speed ramp-up time 879; may also indicate or demarcate a transition between the first mode and the second mode.

In practice, Equation 7 is only used as a qualitative instruction for the initial or preliminary estimation of one or more candidates for $K_\omega^*$, where further experimental tuning or iterative tests of candidates for $K_\omega^*$ are sometimes or usually needed. In practice, $K_\omega^*$ cannot be solely determined or estimated by Equation 7 because: 1) the actual torque load, $T_L$ can be less than the maximum torque level for $T_L$ (e.g., worst-case torque level for a given work task and configuration of vehicle, data processing system inverter and electric machine 117) used in Equation 7; 2) the assumption that $\omega_r$ closely follows $\omega_e^*$ is not always true during all sampling intervals or time periods, such as for a transient time period at the very beginning of the startup of the rotor of the electric machine 117 from a stationary state, a stopped state or stalled state; 3) making or setting $\theta_{L\_ave} > 0$ does not guarantee stable control, because instantaneous $\theta_L$ could still be <0 that makes control unstable. Nevertheless, Equation 7 provides a good starting point that significantly decreases the tuning effort for $K_\omega^*$.

Smooth, Continuous Transition to BEMF Mode

FIG. 8 is a block diagram of one embodiment of the current regulator 135. Like reference numbers in any two drawings indicate like features, steps or elements; like reference numbers in FIG. 1A and FIG. 1B, collectively, and FIG. 8 indicate like features or elements.

As illustrated in FIG. 8, one embodiment of the current regulator 135 comprises a selector (252 or 752), such as command/parameter selector, that is coupled to CVCR 259. In turn the CVCR 259 receives input data (e.g., 859) from the first transform module 113 and provides output data (e.g., 861) to the second transform module 140. The selector module (252 or 752) receives input data of first mode parameters 851 (e.g., IF control parameters), second mode parameters 853 (e.g., BEMF control parameters), or both, along with sensorless enable/disable input 852. The selector module (252 or 752) selects or outputs selected control parameters 854 among the first mode parameters 851 and the second mode parameters 853 (e.g., BEMF control parameters) for provision to the CVCR 259.

In one example, the first mode parameters 851 (e.g., IF control parameters) comprise one or more of the following: is $i_{d\_IF^*}$, $i_{q\_IF^*}$, $\omega_{e\_IF}$, and $\theta_{e\_IF}$; the second mode parameters 853 (e.g., BEMF control parameters) comprise one or more of the following: $i_{d\_SL}^*$, $i_{q\_SL}^*$, $\omega_{e\_SL}$, and $\theta_{e\_SL}$; the selector outputs one or more of the following output parameters 854 for controlling the electric machine 117 in the first mode, the second mode or both: $i_d^*$, $i_q^*$, $\omega_e$, and $\theta_e$. Further, the primary output parameters, $i_d^*$, $i_q^*$, $\omega_e$, are inputted into the CVCR 259; the secondary output parameter, the electrical angular rotor position, $\theta_e$ is inputted into the first transform module 113 (e.g., $i_{abc}$ to $i_{dq}$ transform), together with observed phase currents ($i_{abc}$), at the inverter terminals, determine the corresponding observed direct-axis current ($i_d$) and the corresponding observed quadrature axis current ($i_q$).

The CVCR 259 receives the observed (electric) rotor speed 857 of the electric machine 117 ($\omega_e$), the commanded quadrature-axis current ($i_q^*$) 858, the commanded direct-axis current ($i_d^*$) 858, and the observed current 859, which includes quadrature axis-current (iq), and the observed direct-axis current (id). In particular, the observed quadrature axis current (iq) 859, and the observed direct-axis current (id) 859 are provided to the CVCR 259 by the first transform module 113 based on the secondary output parameter or electrical angular position 856, $\theta_e$ and the observed phase currents 855 ($i_{abc}$) at the inverter alternating current terminals (e.g., 180a, 180b, 180c). The CVCR 259 determines or estimates the commanded voltage 861, which includes commanded direct-axis voltage (vd*) and the commanded quadrature-axis voltage (vq*), based on the above received, selected control parameters 854 of the electric machine 117, the observed electrical rotor speed 857 ($\omega_e$), the commanded quadrature-axis current ($i_q^*$) 858, the commanded direct-axis current ($i_d^*$) 858 and the observed quadrature axis current (iq) 859, and the observed direct-axis current (id) 859. The observed quadrature axis current (iq), and the observed direct-axis current (id) may be collectively referred to as the observed currents 859.

Once the rotor speed equals or exceeds a threshold speed, the electronic data processor 264, the mode selector 252 or the command/parameter selector can switch from the first mode (e.g., IF mode) to the second mode (e.g., BEMF mode). An improper (e.g., brutal) mode transition can cause overcurrent fault, such as sending a current or voltage transient pulse to the stator windings of the electric machine 117 that can potentially reduce the longevity of the electric machine 117 and increase thermal loading on the electric machine 117. To prevent or reduce the possibility of an overcurrent fault, a limiter 254, an electronic data processor 264, or the data processing system 120 is configured to prevent, limit or minimize the instantaneous change in the commanded multiphase voltage ($v_{abc}^*$) at the mode transition instant or transition period between the first mode and the second mode in accordance with the following process.

During control of the electric machine 117, as illustrated in FIG. 8, the current regulator 135 (e.g., CVCR 259) and a second transform module 140 collectively determine commanded multiphase alternating current voltages 862 (e.g., $v_{abc}^*$) based on inputs of the observed angular position 860 (e.g., $\theta_e$ or $\theta_{e\_IF}$ for the first mode (e.g., IF mode), and the commanded direct-axis voltage ($v_d^*$) 861 and the commanded quadrature-axis voltage ($v_q^*$) 861 from the CVCR 259.

In the first mode (e.g., IF control), the electronic data processor 264 or current regulator 135 adjusts, sets, or generates the first-mode, commanded quadrature-axis current equal to the ramp-up current and the first-mode commanded direct axis current equal to zero, where the commanded position and speed (e.g., from the position and speed estimator 114 in the first mode) are used as the position and speed feedback in accordance with the following equations:

$$i_{q\_IF}^* = I_{RampUp}; i_{d\_IF}^* = 0 \qquad (7.1)$$

$$\theta_{e\_IF} = \int \omega_{e\_IF} dt; \text{ and} \qquad (7.2)$$

$$\omega_{e\_IF} = K_\omega^* \cdot t, \text{ are used as the position and speed feedback.} \qquad (7.3)$$

In the second mode (e.g., BEMF-based sensorless control), the electronic data processor 264 or current regulator 135 adjusts, sets, or generates the second-mode, commanded quadrature-axis current based on speed regulation, $i_{q\_SL}^*$ and the second-mode commanded direct axis current, $i_{d\_SL}^*$ equal to zero (except for operation in the flux weakening region), where the second-mode, electrical position, $\theta_{e\_SL}$, and the second-mode speed, $\omega_{e\_SL}$, are estimated from respective position and speed observers, such as the position and speed estimator 114 operating in the second mode:

Note that even in the first mode (IF mode), the second mode (e.g., BEMF-mode), the position and speed estimator 114 comprises BEMF-based position and speed observer that are still running in the background. In other words, $\theta_{e\_SL}$ and $\omega_{e\_SL}$, are available in the first mode (e.g., IF mode), except that their values are not accurate at low speed, but they are not used for electric machine 117 control until the sensorless control changes to the second mode (e.g., BEMF mode).

Figure 9:
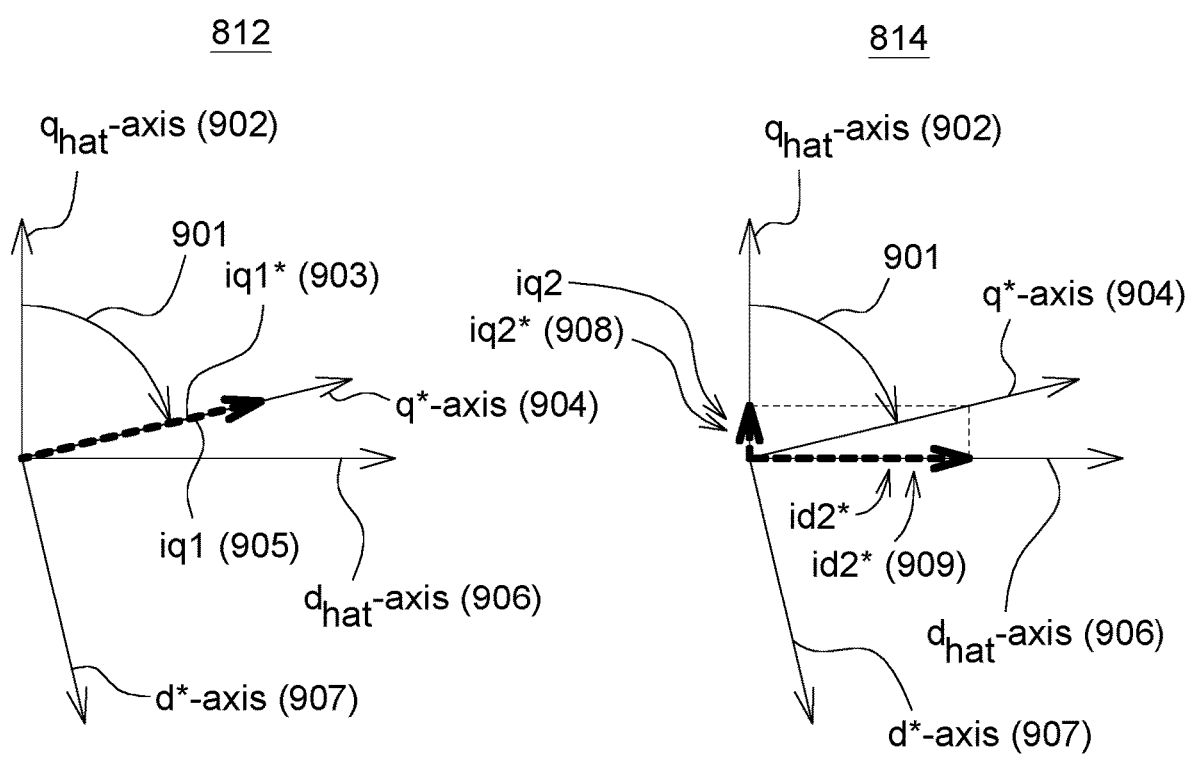
FIG. 9 is an illustrative example of a steady state commanded current (iq1*) in a first graph of rotating d-q-axes reference frame and a commanded braking BEMF mode current (iq2*) in a second graph of the rotating d-q-axes reference frame.

To avoid an inappropriate instantaneous change of commanded multi-phase voltage (e.g., 862), $v_{abc}*$ at the mode transition instant or at the mode transition period between the first mode and the second mode, the following process can be applied, where an inappropriate instantaneous change has voltage change that exceeds a threshold or maximum limit:

(a) In the first mode (e.g., IF control mode), the electronic data processor 264 or the current regulator 135 determines that the true dq-axis reference frame and the commanded dq*-axis reference frame have a phase difference, $\theta_L$, as illustrated in FIG. 7. FIG. 9 is similar to FIG. 7, but the left graph 812 of FIG. 9 shows a first state or first stage current, whereas the right graph 812 shows a second state or second stage current in a start-up process.

For the rotating d-q reference frame in the left graph 812, the $q_{hat}$-axis 902 is perpendicular to the $d_{hat}$-axis 906; for the rotating commanded d-q* reference frame, the q*-axis 904 is perpendicular to the d*-axis 907. In one embodiment, the $q_{hat}$-axis 902 and the $d_{hat}$-axis 906 represent average values of the observed q-axis current and observed the d-axis current, respectively, over one or more sampling intervals, and such average values may represent a geometric mean, mode, or median that is smoothed over the sampling intervals. As illustrated, the commanded q*-axis current, $i_{q1}*$, 903 is substantially or generally aligned with the observed q-axis current, $i_{q1}$, 905 in the alignment stage. The angular displacement or angular position $\theta_{L\_hat}$ or $\hat{\theta}_L$ (901) defines the (electrical) angular position between the $q_{hat}$-axis 902 and the commanded q*-axis 904.

For the rotating d-q reference frame in the right graph 814, the $q_{hat}$-axis 902 is perpendicular to the $d_{hat}$-axis 906; for the rotating commanded d-q* reference frame, the q*-axis 904 is perpendicular to the d*-axis 907. As illustrated, the commanded q*-axis current, $i_{q2}*$, 908 is substantially or generally aligned with the observed q-axis current, $i_{q2}$, 908 in the alignment stage; the commanded d*-axis current, $i_{d2}*$, 909 is substantially or generally aligned with the observed q-axis current, $i_{d2}$, 909 in the alignment stage, where in the right graph 814 the commanded q*-axis current 908 and the commanded d*-axis current 909 define a complementary angle to the angular displacement or angular position $\theta_{L\_hat}$ or $\hat{\theta}_L$ (901). The angular displacement or angular position $\theta_{L\_hat}$ or $\hat{\theta}_L$ (901) defines the (electrical) angular position between the $q_{hat}$-axis 902 and the commanded q*-axis 904.

The left graph 812 of FIG. 9 shows the commanded current, including the commanded q-axis current (e.g., $i_{q1}*$ or $i_{q\_IF1}*$) 903, for the first mode (e.g., IF control commands), where the electronic data processor 264 or the current regulator 135 generates commanded current in accordance with the following equations:

$$i_{q\_IF1}* = I_{Align}; \quad (7.4)$$

$$i_{d\_IF1}* = 0. \quad (7.5)$$

Further, the electronic data processor 264 or the current regulator 135 uses the commanded angular position ($\theta$) as the position feedback for the first transform, by the first transform module 113 (e.g., $i_{abc}$-to-$i_{dq}$ transform). When the current regulation is stabilized, the observed or true current vector will follow the commanded current vector as shown in FIG. 9.

(b) When or if the rotor speed approaches the transition speed threshold (or is stable or increasing close to the speed threshold but not yet at the speed threshold) for the transition from the first mode (e.g., IF mode) to the second mode (e.g., BEMF mode), the position and speed estimator 114, or a position observer associated with the position and speed estimator 114, determines if the estimated position is accurate enough, where the estimated electrical angular position of the rotor of the electric machine 117 is denoted as $\theta_{e\_hat}$ or $\hat{\theta}_e$. The electronic data processor 264 or the position and speed estimator 114 can estimate $\theta_{L\_hat}$ or $\hat{\theta}_L$ and the projections of $i_{q\_IF1}* = I_{q\_RampUp}$ on the estimated true q-axis and d-axis before the mode transition from the first mode to the second mode. Equation 8 through Equation 10 (e.g., below respectively) apply to the transition between the first mode and the second mode (e.g., the transition from the first mode to the second mode during startup process):

$$\hat{\theta}_L = \hat{\theta}_e - \theta*_e; \quad (8)$$

$$i*_{d\_IF2} = i*_{d\_IF1} \cdot \cos \hat{\theta}_L = I_{q\_RampUp} \cdot \cos \hat{\theta}_L \quad (9)$$

$$i*_{q\_IF2} = i*_{q\_IF1} \cdot \sin \hat{\theta}_L = I_{q\_RampUp} \cdot \sin \hat{\theta}_L \quad (10)$$

Note that ($i_{q\_IF1}*$, $i_{d\_IF1}*$) and ($i_{q\_IF2}*$, $i_{d\_IF2}*$) are just two different ways to decompose the same first mode (e.g., IF mode) commanded current vector: ($i_{q\_IF1}*$, $i_{d\_IF1*}$) are in the commanded dq*-reference frame, whereas ($i_{q\_IF2}*$, $i_{d\_IF2}*$) are in the estimated dq_hat reference frame. Thus, based on the above explanation, the following two alternatives effectively generate almost the same current error signals for the commanded current and the electrical angular position (and optionally the electrical speed of the rotor) for the CVCR 259 as follows:

(1) $I_{q1}*$ alternative: The electronic data processor 264 or current regulator 135 uses $i_{q1}* = I_{RampUp}$ and $i_{d1}* = 0$ as the commanded current, and uses $\theta_e*$ for the $i_{abc}$-to-$i_{dq}$ transform to get the $i_{q1}$ and $i_{d1}$ feedback;

(2) Iq2* alternative: The electronic data processor 264 or the current regulator 135 uses $i_{q2}* = I_{RampUp} \cdot \sin \theta_{L\_hat}$ and $i_{d2}* = I_{RampUp} \cdot \cos \theta_{L\_hat}$ as the current commands, and using $\theta_{e\_hat}$ for the $i_{abc}$-to-$i_{dq}$ transform to get the $i_{q2}$ and $i_{d2}$ feedback;

(c) At the mode transition instant or mode transition period, the electronic data processor 264 or the current regulator 135 does the following:

First, in step S305a after step S304 in FIG. 3, the electronic data processor 264 or current regulator 135 sends adjusts, resets or commands the speed regulator 253 such that its first output in the BEMF mode can lead to $i_q*$ and $i_d*$ matching the last $i_{q\_IF2}*$ and $i_{d\_IF2}*$ that are calculated by above Equation 9 and above Equation 10;

Second, in step S305b after step S304 in FIG. 3, the electronic data processor 264 or current regulator 135 uses the last (prior to transition) observed (electrical) angular position of the rotor, $\theta_{e\_hat}$, of the electric machine 117 in the IF mode (where a position observer of the position sand speed estimator 114 can run in the first mode (e.g., IF mode) or simultaneously with the second mode) as the first position feedback (after transition to the second mode) for the $i_{abc}$-to-$i_{dq}$ transform (e.g., by the first transform module 113) to get the first $i_q$ and $i_d$ feedback in the second mode (BEMF mode);

Third, in step S306 of FIG. 3, in one configuration to limit the instantaneous change in the commanded voltage, the data processor 264, current regulator 135, or another module applies one or more slew limiters to the speed feedback used in CVCR 259 and to the position feedback used for the second transform (e.g., $v_{dq}^*$-to-$v_{abc}^*$ transform) by the second transform module 140.

Here, steps S305a and S305b eliminate or reduce the possibility of an inappropriate instantaneous change of the current error signals used in CVCR 259, where the inappropriate instantaneous change refers to a material change in the current error signal or current signal that is greater than a threshold. In step S306 as modified in the above configuration further eliminates or reduces the possibility of an inappropriate instantaneous change of the $\omega_e \cdot \lambda_f$ term in CVCR 259 and in second transform (e.g., $v_{dq}^*$-to-$v_{abc}^*$ transform), respectively. The advantage of the above method is that there is no change of the current command along the true q-axis before and after the mode transition, thus the transient torque ripple and speed ripple are minimized; in some configurations any residual or excessive $i_d^*$ can be damped to 0 using one or more limiters 254 (e.g., slew limiters), such as first slew regulator within the current regulator 135 or a second slew regulator.

IF Sensorless Stop

Figure 12:
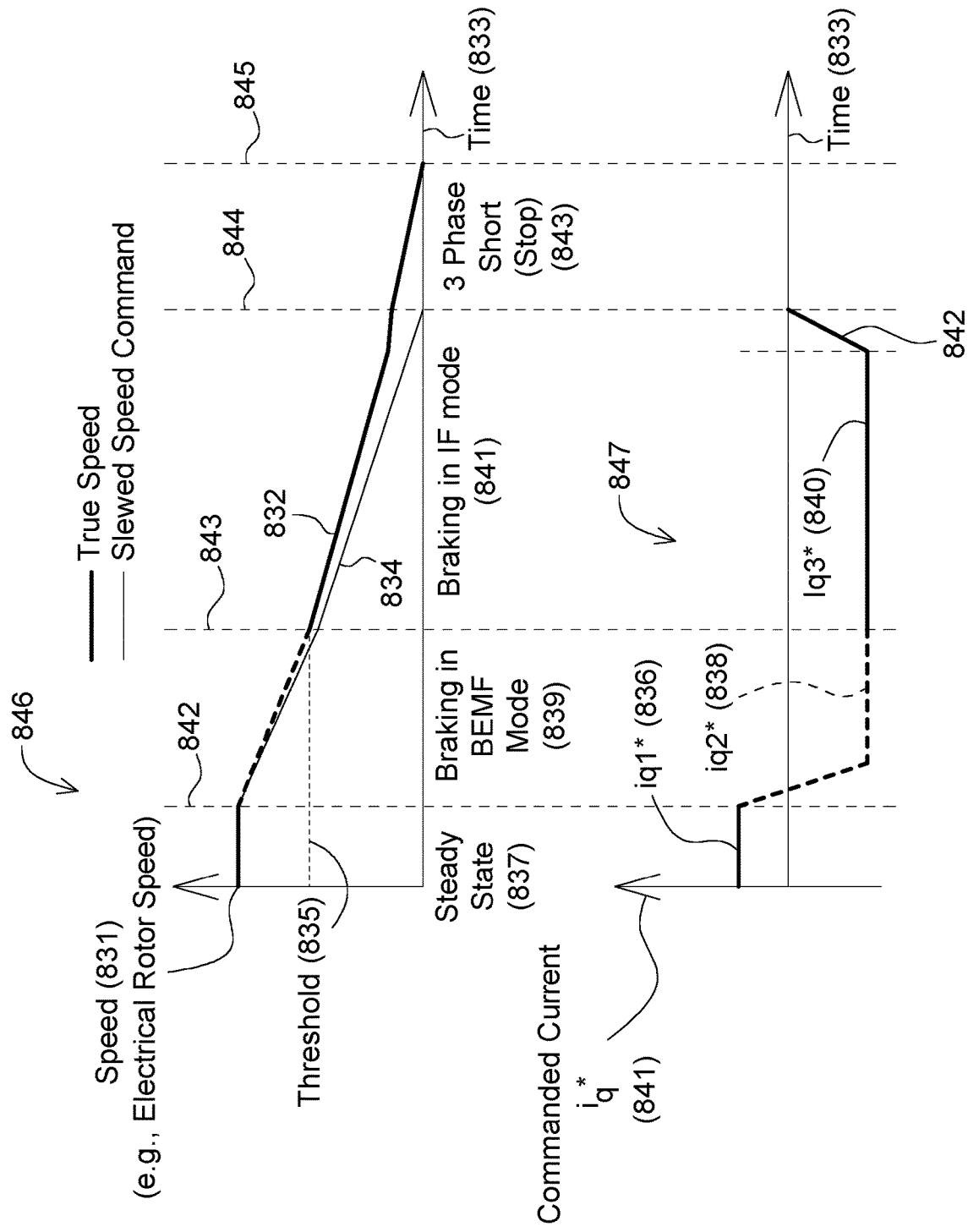
FIG. 12 illustrates a stopping process of the rotation of a rotor of an electric machine via a lower graph of commanded quadrature-axis current versus time and an upper graph of electrical rotor speed versus time for a common time scale for the upper graph and lower graph.

In FIG. 12, the IF sensorless stop may begin from steady state operation 837 of the rotor at a speed range within the second mode. There are three stages in the proposed overall sensorless stop process: (1) Braking in second mode 839 (e.g., BEMF Mode); (2) Braking in first mode 841 (e.g., IF Mode or V/Hz Mode); and (3) Multi-phase short of windings 843 (e.g., three-phase short or grounding of stator windings to disable rotation of electric machine 117). The change of the slewed rotor speed command 831, the observed or true speed and the commanded current 841, $i_q^*$, during stopping process are shown in FIG. 12, which are explained next:

The first stage or first state of the stopping process is the braking or regenerative braking 839 of the electric machine 117 in the second mode (e.g., BEMF Mode). Assume the electric machine 117 is running or operating in the BEMF mode and at steady state 837 before the stopping process begins at a first time 842; once the stopping process starts, the slewed speed command 834 will decrease. The observed, actual or true speed 832 of the rotor of the electric machine 117 will track the slewed speed command and decrease because if the speed regulator 253, data processor 264, current regulator 135, or data processing system 120 which generates the corresponding commanded current 841, $i_q^*$. Here, in the upper graph 846 of FIG. 12, the actual true speed curve 832 and in the lower graph 847 of FIG. 12 the commanded current curve 841, $i_q^*$, depend on many parameters or settings of the data processing system 120, such as the speed-control-loop gains, current-control-loop gains, and torque-speed curve limits; for example, a portion of the true speed curve 832 between the first time 842 and the second time 843 in the braking BEMF mode 839 is shown in dashed line in FIG. 12 merely for illustrative purposes.

When or if the estimated speed (of the rotor of the electric machine 117) is decreased to be lower than the speed threshold 835 (e.g., speed threshold associated with the transition) for the second mode-to-first-mode transition (e.g., BEMF-to-IF mode transition), the data processing system 120, the mode controller 256, current regulator 135 or electronic data processor 264 can change control from the second mode to the first mode (e.g., sensorless control changes from the BEMF mode to the IF mode) at the second time 843. Accordingly, when or if the estimated speed of the rotor of the electric machine 117 is decreased to be lower than the speed threshold 835 of the rotor of the electric machine 117, the data processing system 120, the mode controller 256, current regulator 135 or electronic data processor 264 operates in the first mode 841 (e.g., Braking in IF Mode) after the transition from the second mode to the first mode. Here, in the stopping process of the rotation of the rotor of the electric machine 117, the data processing system 120 and its software instructions are configured to control or manage a smooth, continuous mode transition between the first and second mode, or rather from the second mode to the first mode.

In the stopping mode where the rotor of the electric machine 117 approaches a stop from steady state operation 837 the second mode, the following steps may be applied by the electronic data processing system 120, the electronic data processor 264, or the current regulator 135, which may be collectively or individually referred to as the controller 266:

(A) the controller 266 (as defined above) is configured to adjust, reset, or command the first-step position (e.g., initial position or entry position) and speed in the first mode (e.g., IF mode) to have the same values of the last-step position and speed (e.g., exit position and speed) in the second mode (e.g., BEMF mode);

(B) the controller 266 (as defined above) is configured to adjust, set, or command the commanded quadrature axis current 841 ($i_q^*$) in the first mode (e.g., IF mode) to have the same value of the last-step $i_q^*$ in the second mode (e.g., BEMF mode) for a configurable duration before the controller 266 decreases the commanded quadrature-axis current ($i_q^*$) to zero;

(C) the controller 266 (as defined above) decreases the (slewed) commanded (electrical) rotor speed, $\omega_e^*$, from its last value (e.g., exit (electrical) rotor speed value prior to entry into the first mode) in the second mode (e.g., BEMF mode) to approximately zero or approaching zero through one or more slew limiters, such as first slew limiter in the current regulator 135 or a second slew limiter;

(D) the controller 266 (as defined above) decreases commanded quadrature-axis current $i_q^*$, to approximately zero or approaching zero before the slewed commanded (electrical) rotor speed, $\omega_e^*$, reaches zero to avoid the oscillation.

Here, in FIG. 12 in the second mode (e.g. BEMF mode) the controller 266 (as defined above, such as the current regulator 135) can optionally command a negative commanded quadrature-axis current 841, $i_q^*$: (a) such as illustrated by the dashed line in the braking in the BEMF mode 839 in the lower graph 847, which shows the commanded quadrature-axis current 838, $i_{q2}^*$; and (b) such as the braking in the first mode 841 (e.g., IF mode), with the commanded quadrature-axis current 840, $i_{q3}^*$, to create an extra amount of duration having braking torque to decelerate the rotor rotation more quickly than otherwise possible. Further, if and when the (slewed) commanded electric rotor speed 831, $\omega_e^*$, on the slewed speed commanded curve 834 in the upper graph 846 reaches approximately zero (e.g., at the third time 844) or approaches zero (true speed is not zero before grounding the stator windings (in the multi-phase short state) as shown in FIG. 12), the mode controller 256, electronic data processor 264, or data processing system 120 enables or activates the multiphase short state (e.g., three-phase short state) by switching the terminals of windings of the electric machine 117 to a grounded state or chassis ground. Accordingly, in some configurations a multi-phase short state 843 (e.g., three-phase short state) will naturally generate a braking torque in the electric machine 117, which further holds the rotor to a firm stall fast or locked rotor position, such as illustrated at the fourth tie 845.

Position sensorless control facilitates various benefits including, but not limited to the following potential benefits of reduced costs by removing a position sensor (e.g., position encoder or resolver) and accompanying harness, by improving reliability and performance, by providing backup limp-home mode remedy for operating of a vehicle with the electric machine acting as the traction drive. The first mode (e.g., IF mode or V/Hz mode) can extend the operating range (e.g., speed range or combined speed and torque operational ranges) of the position sensorless control of a synchronous permanent magnet (SPM) electric machine to low-speed region and zero-speed start up and stopping (e.g., approaching or modeled as a stall condition). Here, the sensorless control process and system discloses a detailed technical implementation of the smooth, continuous transition between the first mode (e.g., IF mode) and the second mode (e.g., BEMF mode). Further, this disclosure describes a startup and stop scheme that can achieve smooth, continuous mode transition (bidirectionally) between the first mode and the second mode, as well as robust and fast startup and stop process of the electric machine via position sensorless control. The method and system facilitates reliable sensorless control, which enables a complete sensorless control solution for practical applications that are driven by electric machines, such as mowers, fan, pump, compressor, engine starter, or turbo charger.

The proposed scheme can reduce the magnitude of the current and transients at the alternating current terminals of the electric machine during a mode transition between the first mode and the second mode, during the stopping process or the starting process of rotation of the electric machine. For example, the method and system is well suited to reduce the magnitude of a change in current associated the motor real or observed quadrature-axis current before and after the mode transition. Therefore, the method and system is well suited to minimize transient torque ripple and speed ripple in the rotor of the electric machine.

Having described one or more embodiments, it will become apparent that various modifications can be made without departing from the scope of the invention as defined in the accompanying claims.

The following is claimed:

1. A method for controlling an electric motor via an inverter, the method comprising:
   estimating a rotor speed of an electric motor to determine whether to control the inverter to operate the electric motor in a first mode or a second mode, wherein the first mode comprises a current frequency control mode and wherein the second mode comprises a back electromagnetic force mode;
   determining a first current command associated with a first mode of operating the electric motor, if the estimated rotor speed is a less than a speed threshold;
   determining a second current command associated with a second mode of operating the electric motor if the estimated rotor speed is equal to or greater than the speed threshold; and
   limiting an instantaneous change in a commanded voltage applied to the electric motor during a transition between the first mode and the second mode, wherein the limiting of the instantaneous change further comprises adjusting or resetting a controller or regulator such that an initial commanded direct-axis current ($i^*_d$) and an initial commanded quadrature-axis current ($i^*_q$), in the second mode, are aligned to match a final commanded direct-axis current and a final commanded quadrature-axis current in the first mode during a start-up where an increasing rotational speed of the rotor changes to exceed the speed threshold for a transition between the first mode and the second mode.

2. The method according to claim 1 wherein the final commanded direct-axis current ($i_{d\_IF2}^*$) and final commanded quadrature-axis current ($i_{q\_IF2}^*$) in the first mode (IF mode) are determined with respect to the following equations:

$$\widehat{\theta_L^-} = \widehat{\theta_\mu^-} - \theta_e^*$$

$$i_{d\_IF2}^* = i_{d\_IF1}^* \cdot \cos\widehat{\theta_L^-} = I_{q\_RampUp} \cdot \cos\hat{\theta}_L$$

$$i_{q\_IF2}^* = i_{q\_IF1}^* \cdot \sin\widehat{\theta_L^-} = I_{q\_RampUp} \cdot \sin\hat{\theta}_L$$

where $\widehat{\theta_L}$ ($\theta_L$\_hat) is an average angular position difference between a true angular position of the rotor of the electric machine or an average observed angular position $\widehat{\theta_e}$ ($\theta e$\_hat) and a commanded angular position $\theta^*_e$ of the rotor of the electric machine; $i_{d\_IF1}^*$ is the commanded direct-axis current in the commanded d-q-axes-reference frame; $i_{q\_IF1}^*$ is the commanded quadrature-axis current in the commanded d-q-axes-reference frame; $i_{d\_IF2}^*$ is the commanded direct axis current in the estimated d-q-axes-hat reference frame that represents an average commanded direct axis current; $i_{q\_IF2}^*$ is the commanded quadrature axis current in the estimated d-q-axes-hat reference frame that represents an average commanded quadrature axis current; and $I_{q\_RampUp}$ is the quadrature axis component of the ramp-up current for the first mode.

3. The method according to claim 1 wherein the limiting of the instantaneous change further comprises:
   estimating, by a position observer, an electrical angle of the rotor based on the last electrical angular position in the first mode as the first position feedback that comprises a proxy or substitute for observed electrical angle, the last electrical angular position representing an exit electrical angular position in the first mode and the first position feedback representing an entry or initial position feedback; and
   applying an observed electrical angle of the rotor to a first transform to set an initial quadrature axis current feedback and direct-axis current feedback in the second mode.

4. The method according to claim 1 wherein the limiting of the instantaneous change further comprises:
   limiting a slew rate of the commanded currents in the first mode and second mode based on a speed feedback used in complex vector current regulation (CVCR), the commanded currents comprising the direct-quadrature axes currents and the speed feedback comprising an estimate electrical speed of the rotor; and limiting a change in position feedback used for a second transform from a commanded d-q axes voltage reference frame to a commanded three-phase voltage reference frame.

5. The method according to claim 1 wherein:

during start-up of rotation of the rotor from a stationary state or rest in the first mode, generating an alignment quadrature-axis current for an alignment time; and after the alignment time, in a ramp-up time in the first mode, generating a ramp-up quadrature-axis current until the speed threshold, of the rotor of the electric machine, is attained.

6. The method according to claim 5 wherein:

during the ramp-up time having a first slew rate that is less than a second slew rate, where the first slew rate is applied if the commanded rotor electrical speed is less than a low speed threshold.

7. The method according to claim 6 wherein the second slew rate is associated with the second mode or commanded rotor electrical speed in the first mode that is greater than or equal to the low speed threshold.

8. The method according to claim 1 wherein:

during a steady state operation of the rotor in the second mode, generating a first commanded quadrature-axis current;

during a slowing or braking of rotation of the rotor from a rotating state in the second mode, generating a second commanded quadrature-axis current that is lower than the first commanded quadrature-axis current;

after attaining the speed threshold, during slowing or braking of rotation of the rotor from the rotating state in the first mode, generating a third commanded quadrature axis current that approaches zero prior to grounding one or more windings of the electric machine.

9. The method according to claim 8 wherein a maximum value of the second commanded quadrature axis current and the third quadrature axis current is negative.

10. The method according to claim 1 wherein the limiting of the instantaneous change further comprises:

adjusting or resetting a controller or regulator such that a last commanded direct-axis current ($i_d^*$) and a last commanded quadrature-axis current ($i_q^*$) in the second mode is aligned to match an initial commanded direct-axis current and initial commanded quadrature-axis current in the first mode during a stopping where a decreasing rotational speed of the rotor changes to be less than the speed threshold for a transition between the first mode and the second mode, wherein the last commanded direct-axis current and the last commanded quadrature-axis current represent an exit commanded direct-axis current and an exit commanded quadrature-axis current in the second mode and wherein the initial commanded direct-axis current and initial commanded quadrature-axis current represent an entry commanded direct-axis current and entry commanded quadrature-axis current in the first mode.

11. The method according to claim 1 wherein the initial commanded direct-axis current and the initial commanded quadrature-axis current represents an entry-commanded direct-axis current and an entry commanded quadrature-axis current in the second mode and wherein the final commanded direct-axis current and the final commanded quadrature-axis current represents an exit commanded direct-axis current and an exit commanded quadrature-axis current in the first mode.

12. A system for controlling an electric motor via an inverter, the system comprising:

an estimator configured to estimate a first mode rotor speed under a first current control model and a second mode rotor speed under a second current control mode of the electric motor in accordance with a first speed estimator for the first mode simultaneously with a second speed estimator for the second mode based on observed voltages and observed currents at the terminals of the electric motor;

a mode controller configured to determine whether to control the inverter to operate the electric motor in a first mode or a second mode, wherein the first mode comprises a current frequency control mode and wherein the second mode comprises a back electromagnetic force mode;

a current regulator, the current regulator comprising a first current controller or current-frequency current controller for determining a first current command associated with a first mode of operating the electric motor, if the estimated rotor speed is a less than a speed threshold;

the current regulator, the current regulator comprising a second current controller determining a second current command associated with a second mode of operating the electric motor if the estimated rotor speed is equal to or greater than the speed threshold; and a limiter configured to limit an instantaneous change in a commanded voltage or a commanded current applied to the electric motor during a transition between the first mode and the second mode, wherein the limiter further comprises an electronic data processor that is configured to adjust or reset such that an initial commanded direct-axis current and an initial commanded quadrature-axis current, in the second mode, that are aligned to match a final commanded direct-axis current and final commanded quadrature-axis current in the first mode during a start-up, where an increasing rotational speed of the rotor changes to exceed the speed threshold for a transition between the first mode and the second mode.

13. The system according to claim 12 wherein the final commanded direct-axis current ($i_{d\_IF2}^*$) and final commanded quadrature-axis current ($i_{q\_IF2}^*$) in the first mode (IF mode) are determined with respect to the following equations:

$$\widehat{\theta_L} = \widehat{\theta_e} - \theta_e^*$$

$$i_{d\_IF2}^* = i_{d\_IF1}^* \cdot \cos\widehat{\theta_L} = I_{q\_RampUp} \cdot \cos\widehat{\theta_L}$$

$$i_{d\_IF2}^* = i_{d\_IF1}^* \cdot \sin\widehat{\theta_L} = I_{q\_RampUp} \cdot \sin\widehat{\theta_L}$$

where $\widehat{\theta_L}$ ($\theta_L$_hat) is an average angular position difference between a true angular position of the rotor of the electric machine or an average observed angular position $\widehat{\theta_e}$ ($\theta e$_hat) and a commanded angular position $\theta_e^*$ of the rotor of the electric machine; $i_{d\_IF1}^*$ is the commanded direct-axis current in the commanded d-q-axes-reference frame; $i_{q\_IF1}^*$, is the commanded quadrature-axis current in the commanded d-q-axes-reference frame; $i_{d\_IF2}^*$ is the commanded direct axis current in the estimated d-q-axes-hat reference frame that represents an average commanded direct axis current; $i_{q\_IF2}^*$ is the commanded quadrature axis current in the estimated d-q-axes-hat reference frame that represents an average commanded quadrature axis current; and $I_{q\_RampUp}$ is the quadrature axis component of the ramp-up current for the first mode.

14. The system according to claim 12 further comprising:
a position observer or position and speed estimator configured to provide an electrical angle of the rotor based on the last electrical angular position in the first mode as the first position feedback that comprises a proxy or substitute for observed electrical angle, the last electrical angular position representing an exit electrical angular position in the first mode and the first position feedback representing an entry or initial position feedback; and
a first transform module configured to provide or set an initial quadrature axis current feedback and direct-axis current feedback in the second mode based on an observed electrical angle of the rotor inputted to first transform module.

15. The system according to claim 12 wherein the first current controller comprises a current-frequency model for estimating rotor speed of the electric machine.

16. The system according to claim 12 wherein the second current controller comprises a Back electromotive force (BEMF) model for estimating rotor speed of the electric machine.

17. The system according to claim 12 further comprising:
a mode controller configured to determine whether to control the inverter to operate the electric motor in a first mode or a second mode, via a mode selector in the current regulator.

18. The system according to claim 12 wherein the limiter comprises a first limiter configured to limit an instantaneous change in the commanded voltage applied to the electric machine during the transition between the first mode and the second mode by limiting or adjusting a slew rate of a commanded direct axis current and commanded quadrature axis current in the first mode and the second mode to a speed feedback used in a complex vector current regulation (CFCR).

19. The system according to claim 18 wherein the limiter further comprises a second limiter configured to limit a change in position feedback used for a mathematical transform from a commanded d-q axes-voltage reference frame to a commanded multiphase voltage reference frame.

20. The system according to claim 12 wherein the initial commanded direct-axis current and the initial commanded quadrature-axis current represent an entry commanded direct-axis current and an entry commanded quadrature-axis current in the second mode and wherein the final commanded direct-axis current and final commanded quadrature-axis current represents an exit commanded direct-axis current and an exit commanded quadrature-axis current in the first mode.

* * * * *